(12) United States Patent
Rideg

(10) Patent No.: US 9,914,570 B2
(45) Date of Patent: Mar. 13, 2018

(54) VALVULAR CLOSURE ELEMENT, CLOSURE CAP COMPRISING THE VALVULAR CLOSURE ELEMENT, AND A METHOD AND AN APPARATUS FOR MANUFACTURING THE VALVULAR CLOSURE ELEMENT

(71) Applicant: Gabor Fazekas, Budapest (HU)

(72) Inventor: Mihaly Rideg, Budapest (HU)

(73) Assignee: Gabor Fazekas, Budapest (HU)

( * ) Notice: Subject to any disclaimer, the term of this patent is extended or adjusted under 35 U.S.C. 154(b) by 36 days.

(21) Appl. No.: 15/103,446

(22) PCT Filed: Dec. 21, 2013

(86) PCT No.: PCT/HU2013/000135
§ 371 (c)(1),
(2) Date: Jun. 10, 2016

(87) PCT Pub. No.: WO2015/092452
PCT Pub. Date: Jun. 25, 2015

(65) Prior Publication Data
US 2016/0311585 A1 Oct. 27, 2016

(51) Int. Cl.
*B65D 5/72* (2006.01)
*B65D 47/20* (2006.01)
(Continued)

(52) U.S. Cl.
CPC ...... *B65D 47/2031* (2013.01); *B29C 45/0003* (2013.01); *B29C 45/4005* (2013.01); *B29K 2023/04* (2013.01); *B29K 2023/10* (2013.01)

(58) Field of Classification Search
CPC ............ B65D 47/2031; B29C 45/0003; B29C 45/4005; B29K 2023/04; B29K 2023/10
(Continued)

(56) References Cited

U.S. PATENT DOCUMENTS 5,897,033 A * 4/1999 Okawa ............... B65D 47/2031
222/212
6,902,076 B2 * 6/2005 Bauer .................. B65D 51/002
215/253
(Continued)

FOREIGN PATENT DOCUMENTS

WO 2012134498 10/2012

OTHER PUBLICATIONS

European Patent Office,Notification of Transmittal (Form PCT/ISA/220, 1 pg.), International Search Report (Form PCT/ISA/210, 3 pgs.) and Written Opinion of The International Searching Authority (Form PCT/ISA/237, 6 pgs.) dated Jun. 23, 2014.

*Primary Examiner* — Lien Ngo
(74) *Attorney, Agent, or Firm* — Wood Herron & Evans LLP

(57) ABSTRACT

The invention is a valvular closure element (5), in particular for dispensing a liquid from a container, the valvular closure element (5) comprising a support element (10) having an annular shape and a valve insert (12) having a side wall and a cover portion made of a resilient material and abutting to an internal surface of the support element (10) by its side wall. The cover portion (17) is formed with slits (14) defining valve flaps (15), wherein each valve flap (15) has an adjoining periphery connected to the side wall. In the valvular closure element (5) the side wall has a cylindrical shape, and the slits (14) are formed radially, and a projection (18) is formed on the external periphery of the support element (10) for each valve flap (15) at the middle of the adjoining periphery corresponding to the respective valve flap (15). The invention is, furthermore, a closure cap comprising the valvular closure element (5), and a method and an apparatus for manufacturing the valvular closure
(Continued)

element (5). The invention also relates to another valvular closure element.

19 Claims, 26 Drawing Sheets

(51) Int. Cl.
    *B29C 45/00*     (2006.01)
    *B29C 45/40*     (2006.01)
    *B29K 23/00*     (2006.01)

(58) Field of Classification Search
    USPC .............. 222/490–497; 220/203.17, 203.18, 220/203.19, 229
    See application file for complete search history.

(56) References Cited

U.S. PATENT DOCUMENTS

| | | | |
|---|---|---|---|
| 7,152,763 B2* | 12/2006 | Stull ................... | B29C 45/0081 222/212 |
| 2003/0042257 A1* | 3/2003 | Uchiyama .............. | B65D 47/36 220/229 |
| 2007/0029352 A1* | 2/2007 | Norris ................ | B65D 47/0833 222/494 |
| 2008/0237271 A1* | 10/2008 | Olechowski ....... | B65D 47/2031 222/494 |
| 2009/0212078 A1* | 8/2009 | Gaus ................. | B65D 47/2031 222/490 |
| 2014/0209644 A1* | 7/2014 | Socier ................ | B65D 47/2031 222/494 |

* cited by examiner

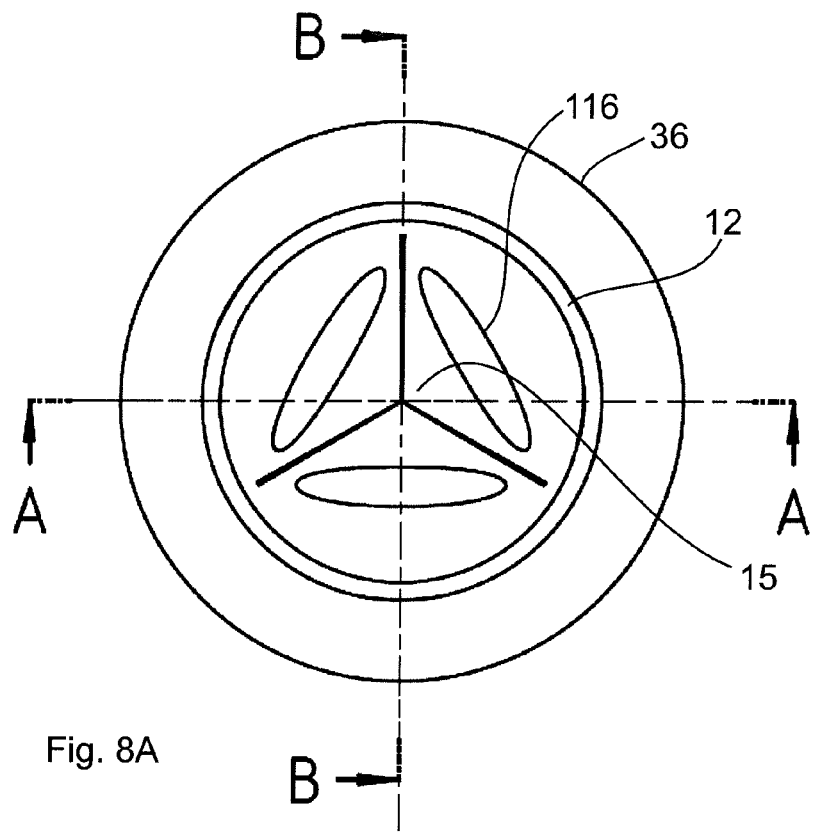
Fig. 8A
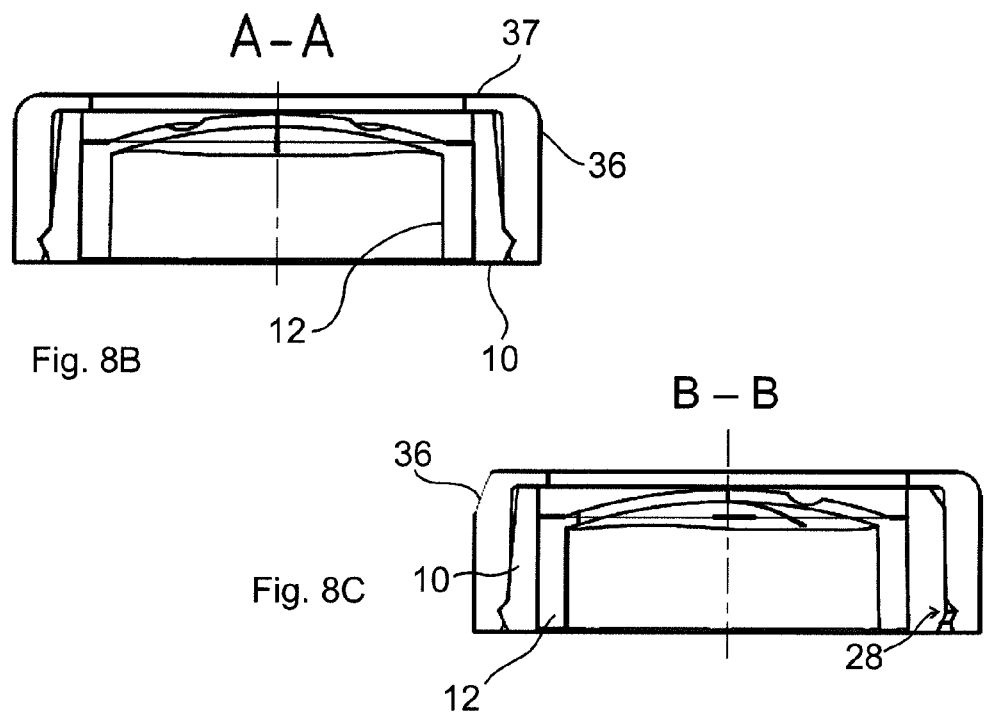
Fig. 8B
Fig. 8C

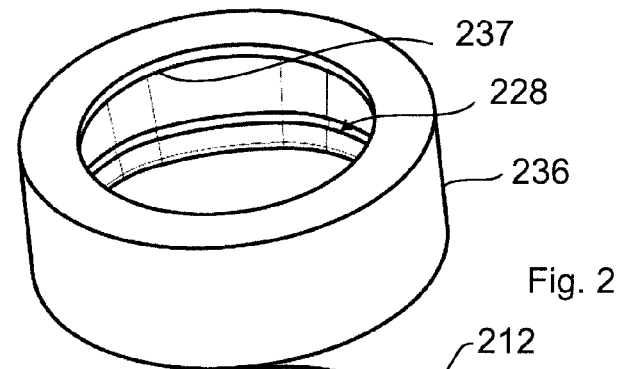
Fig. 21
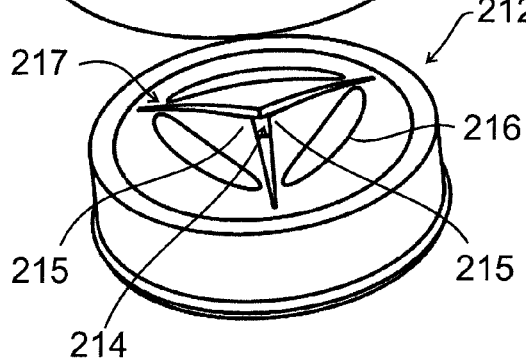
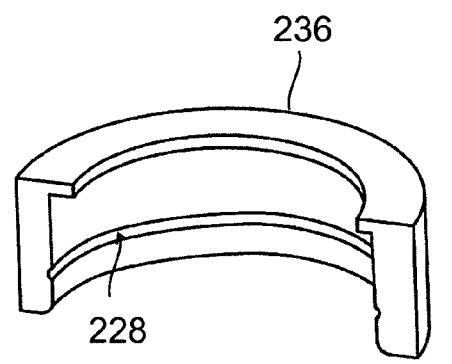
Fig. 22A
Fig. 22B
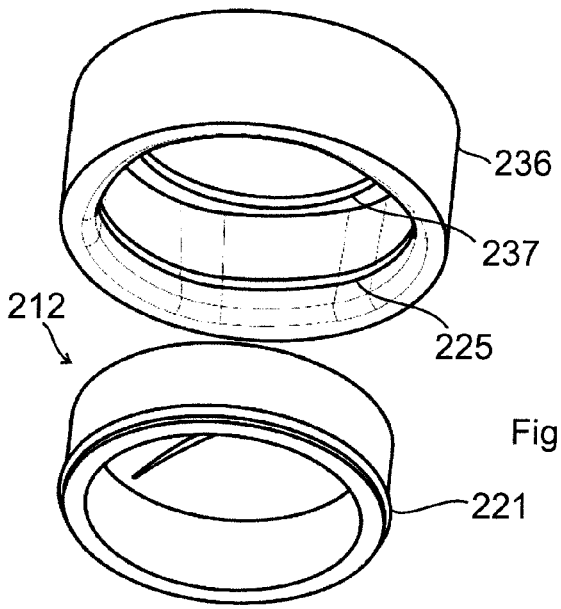
Fig. 23

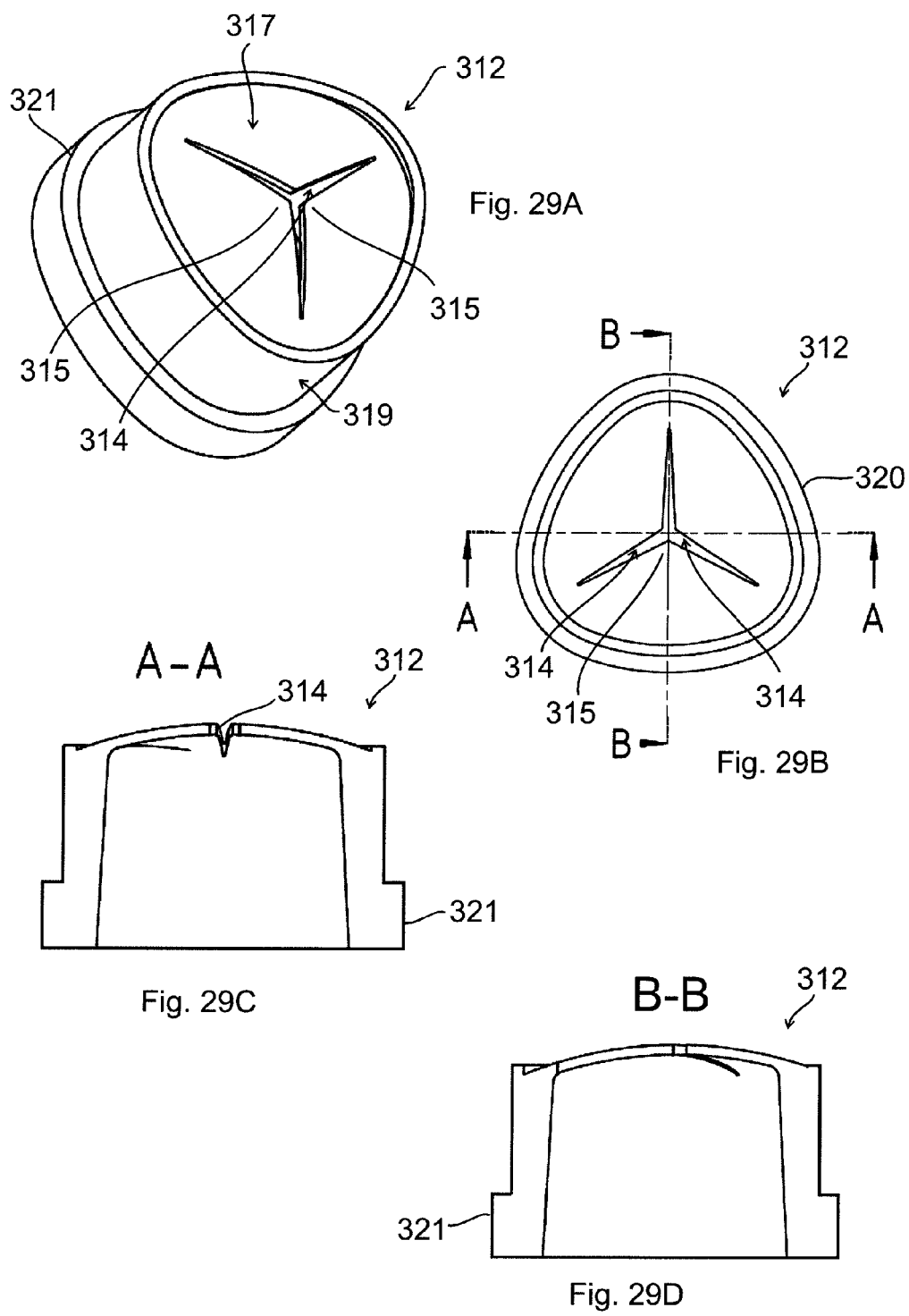

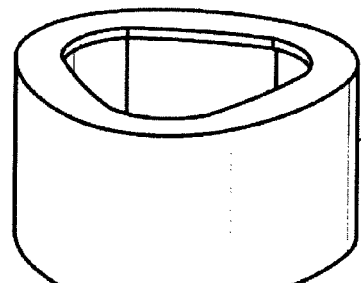
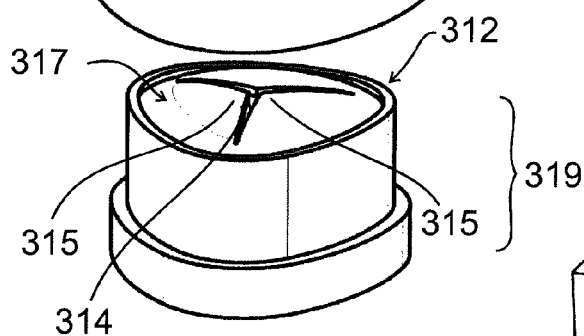
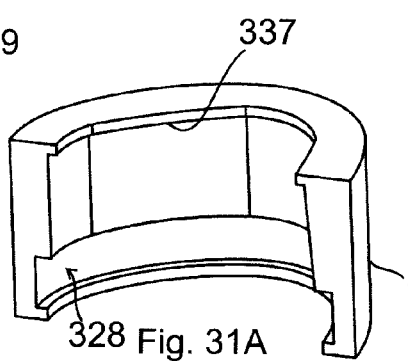
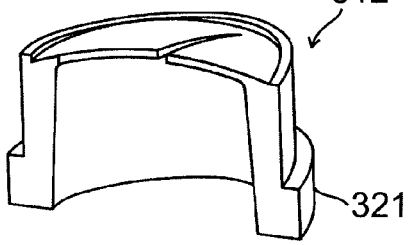
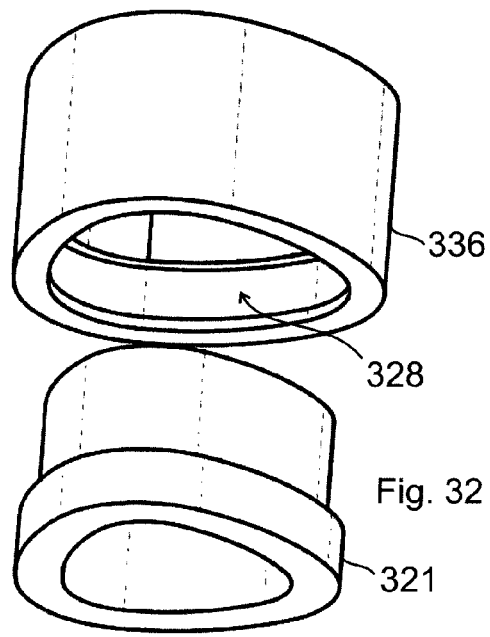
Fig. 30
Fig. 31A
Fig. 31B
Fig. 32

VALVULAR CLOSURE ELEMENT, CLOSURE CAP COMPRISING THE VALVULAR CLOSURE ELEMENT, AND A METHOD AND AN APPARATUS FOR MANUFACTURING THE VALVULAR CLOSURE ELEMENT

This application claims priority, under Section 371 and/or as a continuation under Section 120, to PCT Application No. PCT/HU2013/000135, filed on Dec. 21, 2013.

TECHNICAL FIELD

The invention relates to a valvular closure element comprising a valve insert and a support element encompassing the valve insert. The invention also relates to a closure cap comprising the valvular closure element and a method and an apparatus for manufacturing the valvular closure element. The invention further relates to a valvular closure element comprising a valve insert and a receiving element, and to a closure cap comprising thereof. The valvular closure element is in particular adapted for dispensing liquids (e.g. ketchup, mustard, mayonnaise, shampoo, liquid soap, hair conditioner, etc.) from a container.

BACKGROUND ART

In HU 227 230 B1 a closure cap provided with a valve and adapted for dispensing liquid from a storage container is disclosed. According to the document, a valve insert made of a resilient material is produced by injection moulding with opened valve flaps. The valve insert has a triangle like side wall, i.e. the side wall has an equivalent rotational symmetry as the valve flaps. The valve insert is inserted into a cap having the same symmetry as above. The inner wall of the receiving cap is provided with projections—so-called pressing ribs—to push the valve flaps at the halving line thereof into a closed state.

A similar closure cap similar is disclosed In HU 228 879 B1. As an additional feature, the valve flaps are provided with weakening grooves in order to improve the operation thereof.

A common disadvantage of the above described known solutions is that the valve insert has to be rotationally positioned before inserting into the cap, i.e. the sides of the valve insert and the cap have to be exactly parallel. Even a small error in the positioning may lead to large discrepancies in the operation of the closure cap. For example, an error in the rotational positioning can deteriorate the dispensing efficiency thereof.

Another disadvantage of the known solutions is that the valve insert and the receiving cap are produced separately. In the market, in most cases the valve insert constitutes a product manufactured separately. Therefore, a large quantity of valve inserts has to be packed in the same package, and these products have to be built into the cap of the partner manufacturer elsewhere. These soft articles can get damaged during the transportation, and the valve inserts have to be positioned one by one in another factory.

A further disadvantage of the known solutions is that the cap receiving the valve insert—the product of another factory—needs a very special configuration, i.e. the projections of pressing ribs in its internal periphery.

DISCLOSURE OF THE INVENTION

The primary object of the invention is to provide valvular closure elements, closure caps comprising one of said valvular closure elements and a method and an apparatus for manufacturing the valvular closure element, which are free of the disadvantages of prior art solutions to the greatest possible extent.

A further object of the invention is to provide a valvular closure element which does not necessitate rotational positioning before inserting into a cap.

A yet further object of the invention is to provide a valvular closure element which allows to avoid the deterioration of the valve insert before its insertion into a cap as much as possible.

An object of the invention is to provide an apparatus and a method for manufacturing the valvular closure element.

A further object of the invention is to provide a valvular closure element which can be handled and assembled easier and more effective than the known valvular closure elements.

The objects of the invention can be achieved by the valvular closure element according to claim 1, the closure cap according to claim 4, the method and the apparatus for manufacturing the valvular closure element according to claim 6 and claim 13, respectively, the valvular closure element according to claim 20, and the closure cap according to claim 24. Preferred embodiments of the invention are defined in the dependent claims.

BRIEF DESCRIPTION OF DRAWINGS

Preferred embodiments of the invention are described below by way of examples with reference to the following drawings, where FIG. 8A is a top view of the embodiment of FIG. 1 inserted into another receiving element indicating section lines A-A and B-B, FIG. 8B is a sectional view of the embodiment of FIG. 8A taken along section line A-A, FIG. 8C is a sectional view of the embodiment of FIG. 8A taken along section line B-B, FIG. 21 shows the assembly of an embodiment of the valvular closure element according to the invention using the valve insert of FIG. 20A in a spatial top view, FIGS. 22A and 22B show sectional views of the valve insert and of the receiving element, respectively, of FIG. 21 before assembly, FIG. 23 shows the assembly of an embodiment of the valvular closure element according to the invention using the valve insert of FIG. 20A in a spatial top view, FIG. 29A shows the valve insert of a yet further embodiment of the valvular closure element according to the invention, FIG. 29B shows the valve insert of FIG. 29A in an upper view indicating section lines A-A and B-B, FIG. 29C shows the valve insert of FIG. 29A taken along section line A-A, FIG. 29D shows the valve insert of FIG. 29A taken along section line B-B, FIG. 30 shows the assembly of an embodiment of the valvular closure element according to the invention using the valve insert of FIG. 29A in a spatial top view, FIGS. 31A and 31B show sectional views of the valve insert and of the receiving element, respectively, of FIG. 29 before assembly, FIG. 32 shows the assembly of an embodiment of the valvular closure element according to the invention using the valve insert of FIG. 28A in a spatial top view.

MODES FOR CARRYING OUT THE INVENTION

Figure 1:
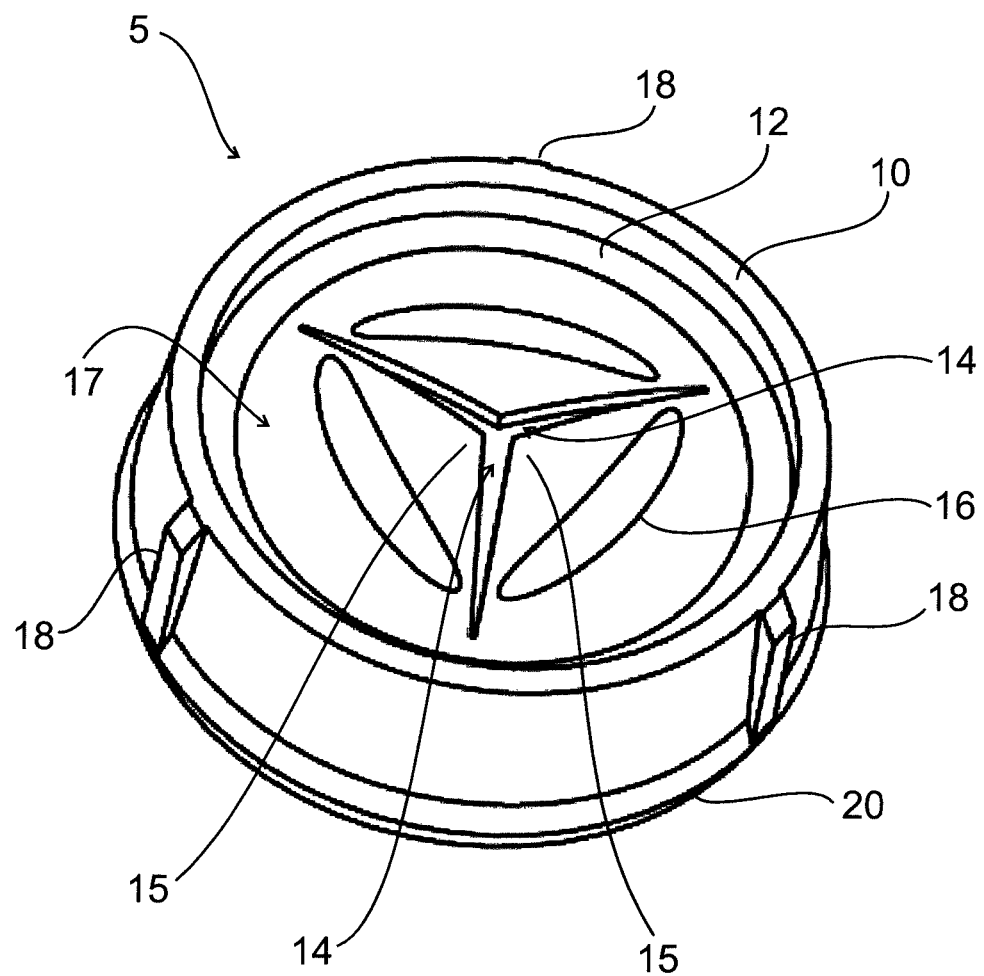
FIG. 1 is an embodiment of the valvular closure element according to the invention in a spatial top view.

In FIG. 1 an embodiment of the valvular closure element according to the invention is shown. The valvular closure element according to the invention is adapted in particular for dispensing liquid from a container. The valvular closure element 5 comprises a support element 10 having an annular shape, and a valve insert 12 having a side wall 19 (see FIG. 3B) and a cover portion 17. The side wall 19 and the cover portion 17 are shown e.g. in FIG. 3B. The valve insert 12 is made of a resilient material, is abutting to an internal surface of the support element 10 by its side wall 19. The cover portion 17 is formed with slits 14 defining valve flaps 15. Each valve flap 15 has an adjoining periphery connected to the side wall 19. The adjoining periphery extends preferably along an arched line at the connection of a valve flap 15 to the side wall 19, but of course, an adjoining periphery with a polygon shape is also conceivable.

Figure 7A:
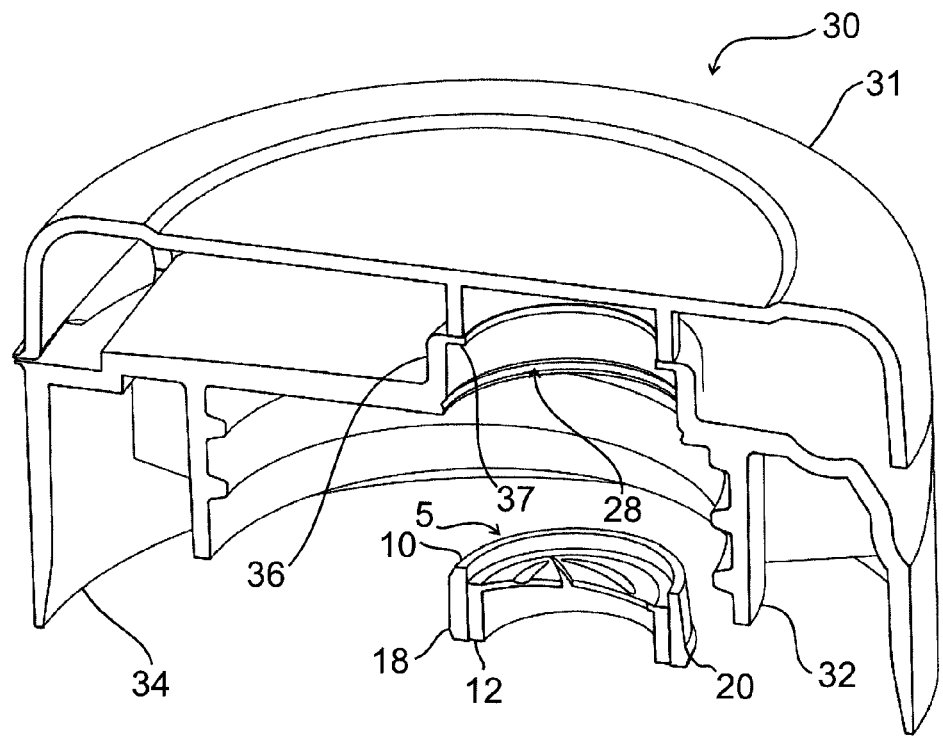
FIG. 7A is a spatial view of a closure cap before inserting the valvular closure element of FIG. 1 into a receiving element thereof.
Figure 7B:
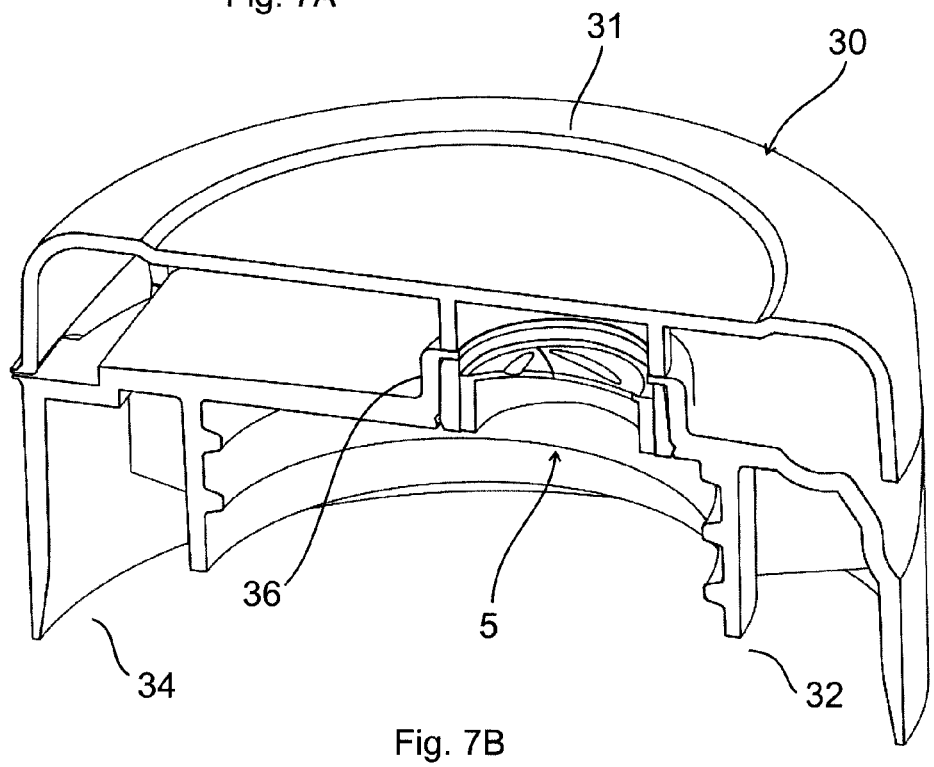
FIG. 7B is a spatial view of a closure cap after inserting the valvular closure element of FIG. 1 into the receiving element thereof.

In the valvular closure element 5 the side wall 19 of the valve insert 12 has a cylindrical shape, and the slits 14 are formed radially. Furthermore, a projection 18 is formed on the external periphery of the support element 10 for each valve flap 15 at the middle of the adjoining periphery corresponding to the respective valve flap 15. Consequently, the valvular closure element 5 according to the invention has a circular symmetry, and need not to be rotationally positioned when inserted into a closure cap, as illustrated in FIGS. 7A and 7B. The projections 18 of the support element 10 only have to be positioned with respect of the valve flaps 15 of the valve insert 12, when the valve insert 12 is introduced into the support element 10. However, as it will be detailed below, in a preferred embodiment of the inventive method for manufacturing the valvular closure element 5, the support element 10 and the valve insert 12 are produced by injection moulding in consecutive steps in the same apparatus, without displacing the support element 10 in the apparatus before injection-moulding the valve insert 12. Moreover, during its production the valve insert 12 is confined—among other subassemblies of the manufacturing apparatus—by the support element 10. This also leads to another advantage, namely that the valve insert 12—when produced—and the support element 10 melt—i.e. attach—together at least to some extent, since these elements abut to each other and solidify together.

In the embodiment illustrated in FIG. 1, a flange 20 is formed on the external periphery of the support element 10. As illustrated by FIG. 7A, the flange 20 is adapted for being received by a respective groove 28 of a receiving element 24 of a closure cap 30. The flange is not necessarily formed on the lower part of the external periphery of the support element 10; a continuous or an interrupted circular flange can be formed on any height of the support element 10.

As it is illustrated in FIGS. 5A to 8C, the valve flaps 15 of the valve insert 12 are locking, i.e. closing when the valvular closure element 5 is inserted in a receiving element 24, 36 of a closure cap 30. As shown in FIG. 7A—and also clear from FIG. 6A—, the valvular closure element 5 is inserted in a receiving element which has a circular shape, i.e. there is no need to have any special configuration for receiving the projections 18. Therefore, by applying a receiving element with a completely circular internal periphery, the valve insert 12 is pushed inwardly in a radial direction by the projections 18 where the projections 18 are formed on the support element 10, but on other parts of the adjoining periphery of the valve flaps 15, the side wall 19 of the valve insert 12 is not deformed. Consequently, by pushing the valve flaps 15 inwardly by the projections 18, the slits 14 narrow until the valve flaps 15 become closed. The flange 20 does not have any role in closing the valve flaps 15; the flange 20 is only responsible for the vertical positioning of the valvular closure element 5 in a closure cap 30.

Figure 6A:
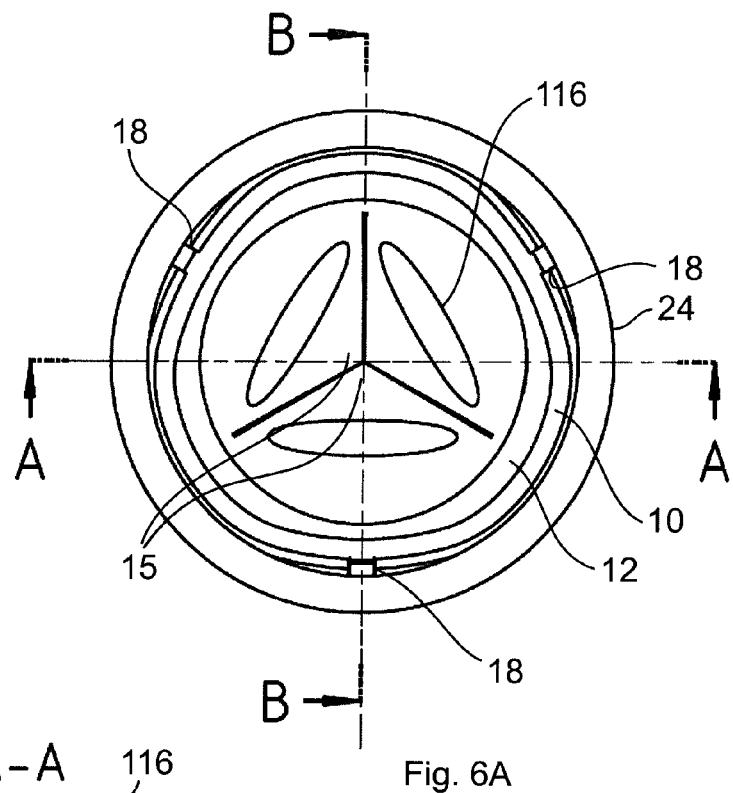
FIG. 6A is a top view of the embodiment of FIG. 5A indicating section lines A-A and B-B.

Furthermore, in the embodiment of FIG. 1, a weakening groove 16 is formed on each valve flap 15 substantially perpendicularly to the halving line of the respective valve flap 15. Weakening grooves 16 or 116 are preferably formed as illustrated in FIG. 2A or 6A, i.e. the external end points of neighbouring slits 14 are substantially connected by the respective weakening groove 16, 116.

Figure 2A:
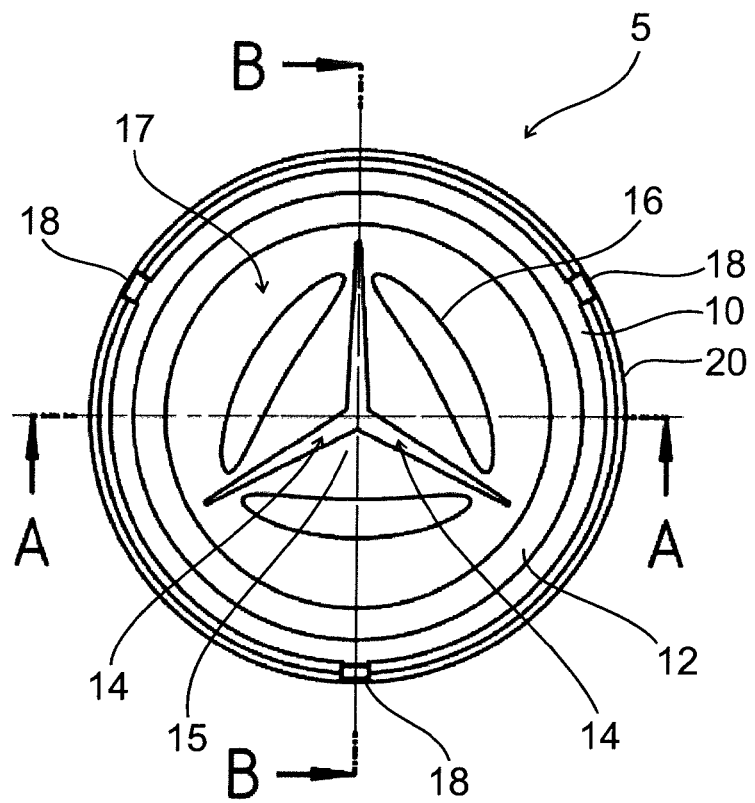
FIG. 2A is the embodiment of FIG. 1 in a top view indicating section lines A-A and B-B.

As shown in FIG. 2A, the weakening groove 16 may have a somewhat curved shape. In this case, the weakening groove 16 does not have a main axis, but—as it is clear from FIG. 2A—it is substantially perpendicular to the halving line of the respective valve flap 15. The halving line of a valve flap 15 connects the peak of the valve flap 15 and the (centre of the) projection 18 corresponding to that valve flap 15. The weakening groove 116 illustrated in FIG. 6A has an elliptic shape. The main axis of the ellipse—i.e. the weakening groove 116 itself—is perpendicular to the halving line of the respective valve flap 15.

In the embodiment shown in FIG. 1, three slits 14 are formed on the cover portion 17 of the valve insert 12. The valve flaps are preferably formed in an ordered way on the cover portion, i.e. there are e.g. three, four or five valve flaps on the cover portion and the view angle (i.e. corner angle) of each valve flap is the same. However, the flaps are not necessarily formed in an ordered way, it is conceivable to form a special combination of valve flaps and projections by which a valvular closure element of appropriate functionality can be provided. Neither every valve flap nor every projection has to have the same dimensions.

In FIG. 2A the valvular closure element 5 is shown from the top indicating section lines A-A and B-B. Section line A-A goes through the common central point of the slits 14 and is perpendicular to one of the slits 14. Section line B-B also goes through the common central point of the slits 14, but it runs in a slit 14 between the beginning of the respective slit 14 and the common point. The projections 18 can be clearly seen in FIG. 2A; the projections 18 are extending from the external periphery of the support element 10. It is also clear from FIG. 2A that the inner periphery of the support element 10 and the external periphery of the valve insert 12 fit very well, because both of these surfaces are cylindrical.

It is shown in FIG. 2A that the slits 14 are opened when the valve insert 12 is surrounded by the support element 10. The slits 14 and the projections 18 are sized with respect to each other so that the slits 14 only become closed when the valvular closure element 5 is inserted in a receiving element, as illustrated by FIGS. 5A to 8C.

Figure 2B:
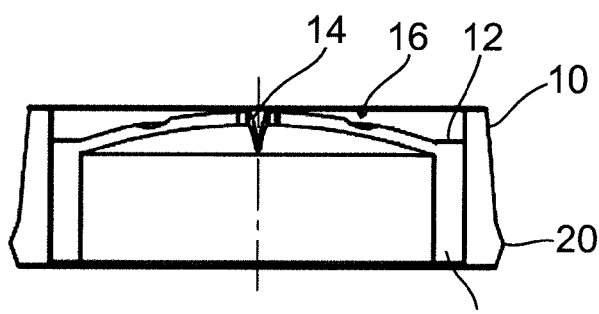
FIG. 2B is a sectional view of the embodiment of FIG. 1 taken along section line A-A.

In FIG. 2B the valvular closure element 5 is shown in a sectional view taken along section line A-A of FIG. 2A. In FIG. 2A the cross section of the weakening grooves 16 of the present embodiment are shown. The side wall 19 of the valve insert 12 is lower than the height of the support element 10. The slit 14 to which section line A-A is perpendicular can be seen from its side in this sectional view. It is clear from FIG. 2B that the cover portion 17 of the valve insert 12 has a dome-like shape. The slits 14 start from the top of the side wall 19 and go up to the top of the dome, i.e. to the common point of the slits 14. The slits 14 are opened at the common point when the valve insert is surrounded by the support element 10. The flange 20 is shown in FIG. 2A, it runs on the external periphery of the support element 10 at a lower part of its side wall. Section line A-A does not go through any projection 18, therefore, the flange 20 can be seen on both sides of the drawing.

Figure 2C:
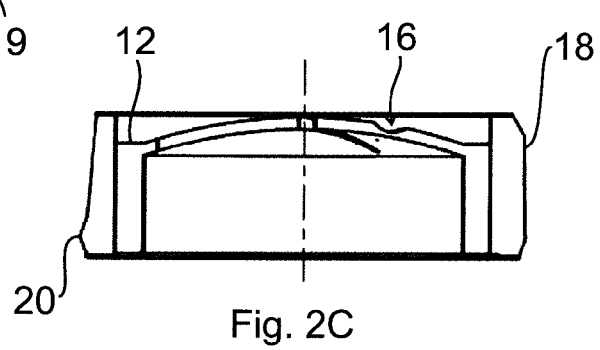
FIG. 2C is a sectional view of the embodiment of FIG. 1 taken along section line B-B.

In FIG. 2C the valvular closure element 5 is shown in a sectional view, but taken along section line B-B. Section line B-B goes through a projection 18, therefore, in FIG. 2C the vertical cross section of a projection 18 can be seen. As shown in the left and right side of FIG. 2C, the vertical cross section of the support element 10 is different at a projection 18 and at other locations of its periphery. In this embodiment, at a general (i.e. non-projecting) location the flange 20 projects out from the external periphery of the support element 10. At heights other than the height of the flange, the support element 10 has a smaller width than at the flange 20.

In the illustrated embodiment the width decreases upwards. However, apart from bevels of the projection 18 at its top and the bottom (at the bottom it is of a similar outline as the lower edge of the flange 20), the support element has a constant width at the projection 18, e.g. equal to the width of the support element 10 at the flange 20. Consequently, the support element needs more space at the projections, therefore in a circular receiving element, the projections 18 are pushed inwards by the internal periphery of the receiving element. This effect will be detailed and illustrated in FIGS. 6A to 8C. The bevels of the support element 10 at the projections 18 may facilitate the insertion of the valvular closure element 5.

Figure 3A:
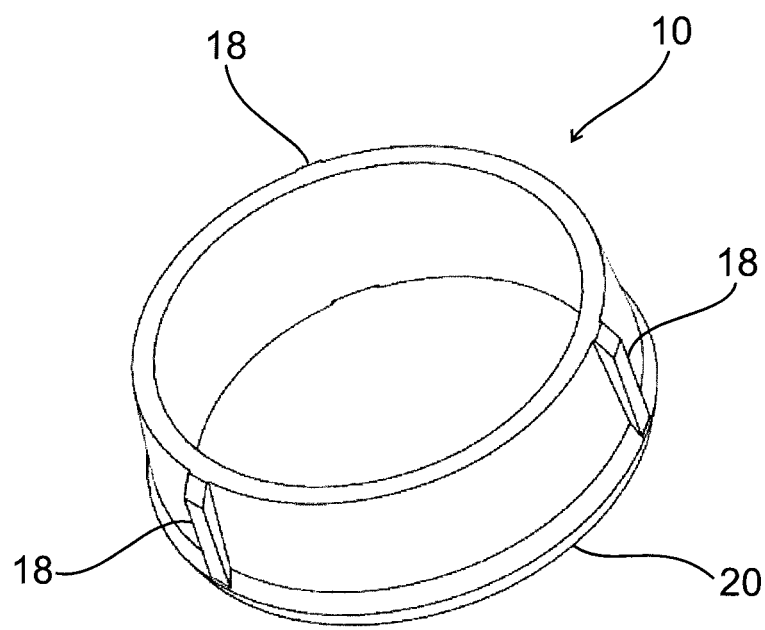
FIG. 3A is a top view of a support element of the embodiment of FIG. 1.
Figure 3B:
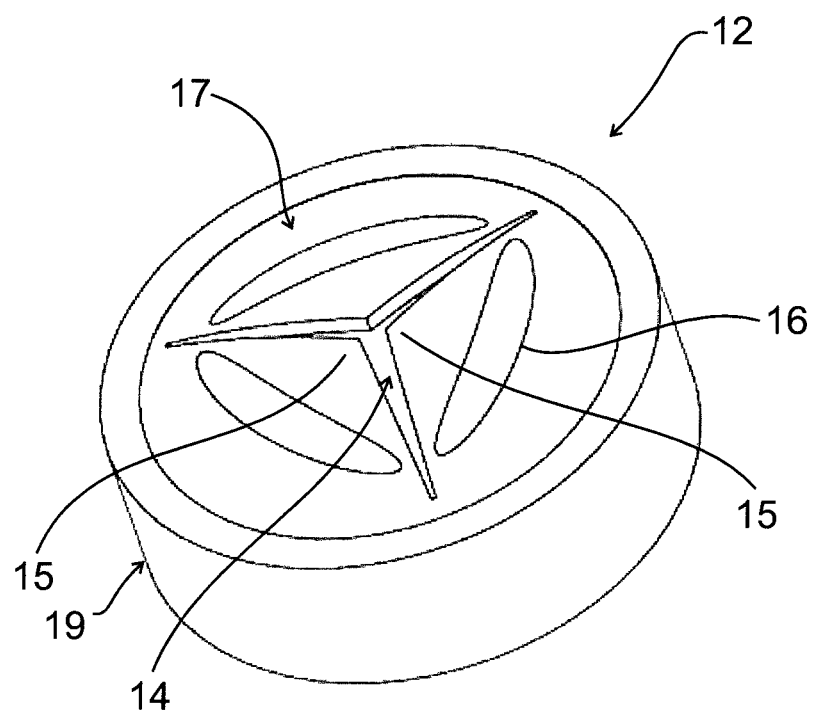
FIG. 3B is a top view of a valve insert of the embodiment of FIG. 1.

In FIG. 3A the support element 10 is shown. It can be seen in this figure that the internal periphery of the support element 10 is not structured, i.e. it has a cylindrical inner surface. In FIG. 3B the valve insert 12 is shown, indicating the cylindrical side wall 19 and the cover portion 17.

Figure 4A:
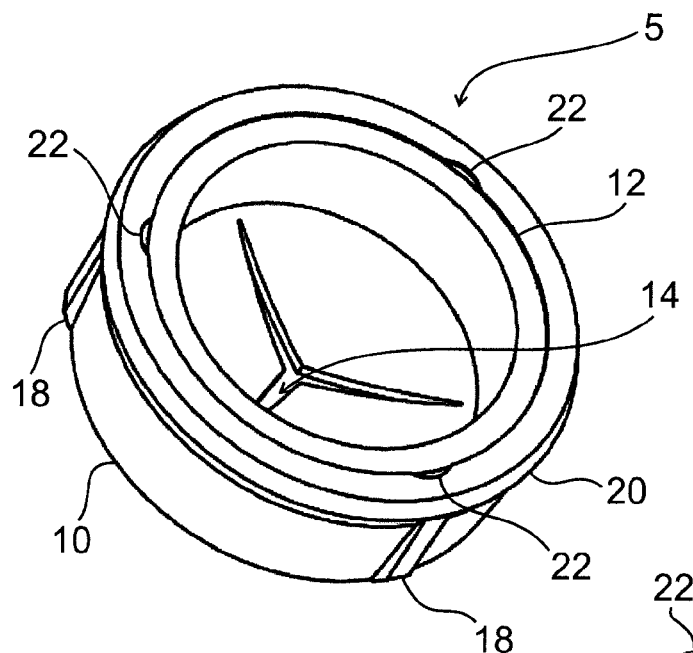
FIG. 4A is a spatial bottom view of the embodiment of FIG. 1.
Figure 4B:
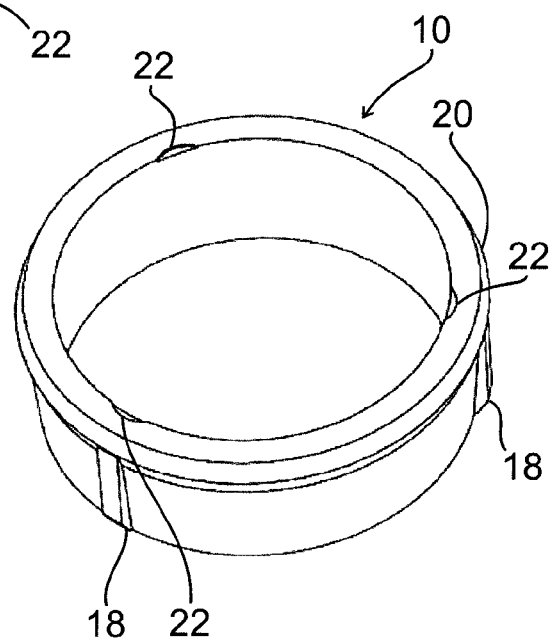
FIG. 4B is a bottom view of the support element of the embodiment of FIG. 1.
Figure 4C:
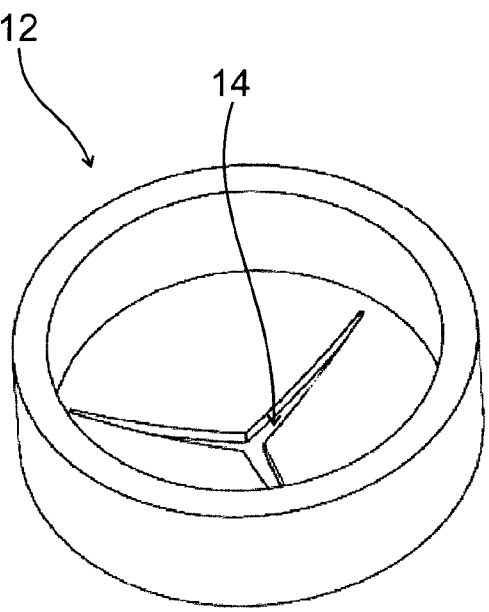
FIG. 4C is a bottom view the valve insert of the embodiment of FIG. 1.

In FIG. 4A a bottom view of the valvular closure element 5 is shown. In this view, the bottom side of the valve flaps 15 can be seen. Indentations 22 playing a role at the injection moulding are also depicted. In FIGS. 4B and 4C the support element 10 and the valve insert 12 can be seen in a bottom spatial view.

Figure 5A:
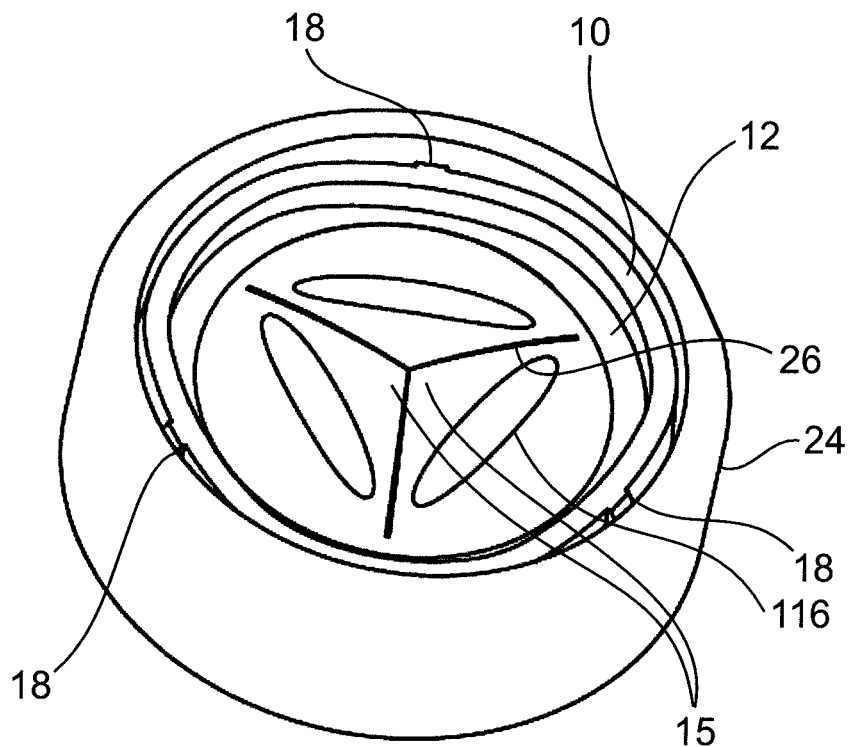
FIG. 5A is a spatial view of the embodiment of the valvular closure element of FIG. 1 inserted into a receiving element.
Figure 5B:
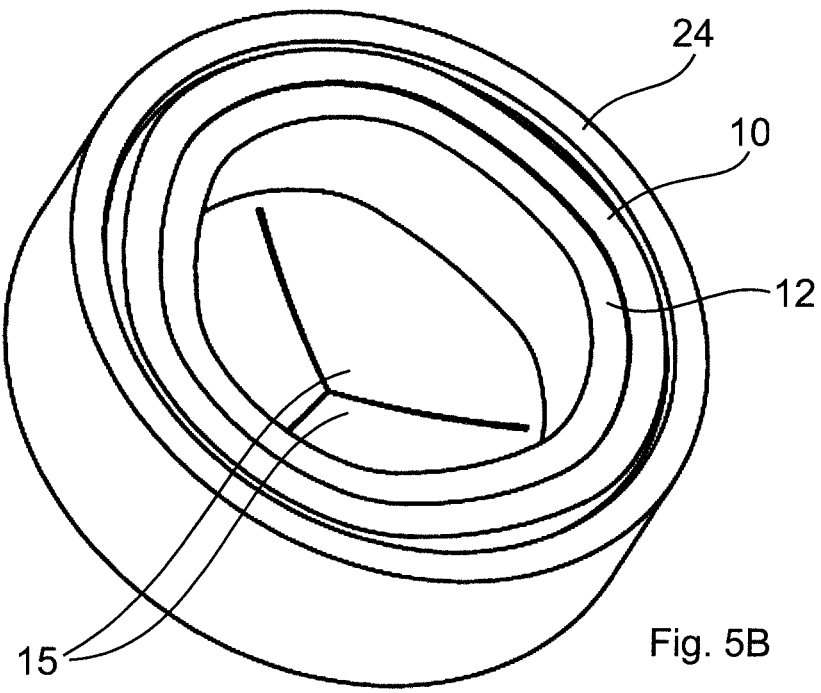
FIG. 5B is another view of the embodiment of FIG. 5A.

In FIG. 5A the embodiment of FIG. 1, i.e. the valvular closure element 5 is shown as inserted in a receiving element 24. It is illustrated in the figure, that the parts of the support element 10 which are close to a projection 18 are pushed inwardly by the receiving element 24. In these parts the external periphery of the support element 10 and the internal periphery of the receiving element 24 do not touch each other since the projections 18 keep away the receiving element 24 from the support element 10. Therefore, a gap is created in between these parts at the top part of the support element 10. The lower part of the support element 10, however, closes well enough, due also to the fact that at the lower edge of a projection 18, the support element 10 follows the outline of the flange 20. This leads to good sealing between the receiving element 24 and the valvular closure element 5, which is crucial when the valvular closure element is used in a closure cap of a container for a liquid. A small gap in these parts of the support element 10 can be also seen in FIG. 5B, in which the combination of the receiving element 24 and the valvular closure element is shown from below.

It is also clear from FIG. 5A, that the remaining parts of the support element 10—i.e. parts of the support element which are not close to any of the projections—are curved and abut to the internal periphery of receiving element 24.

In FIG. 5A it is shown that the valve flaps 15 are closed when the valvular closure element 5 is in a receiving element 24. The mechanism of the closing of the valve flaps 15, i.e. of the narrowing of the slits 14 is the following. The valve insert 12 is made of a resilient material (e.g. a thermoplastic elastomer) and is surrounded by the support element 10 which is made of a harder and stiffer material (e.g. from polyethylene or polypropylene). The hardness of the valve insert is preferably 25 to 55 in the Shore A scale. The external periphery of the valve insert 12 fits to the internal periphery of the support element 10. The receiving element in which the valvular closure element 5 is preferably inserted is even less resilient than the support element (e.g. because of its width), therefore, the receiving element can deform the valvular closure element 5, i.e. the support element 10 and in turn the valve insert 12. The receiving element can also be made e.g. of polyethylene or polypropylene. The support element 10 and the receiving element may be also made of the same material, preferably with a hardness of 80 to 100 on the Rockwell R scale.

In FIG. 6A the combination of the valvular closure element 5 and the receiving element 24 is shown from above. In this figure all of the gaps between the support element 10 and the receiving element 24 can be clearly seen. So, the deformation of the support element 10 and the valve insert 12 is observable. The valvular closure element 5 is a bit deformed when it is inserted into the receiving element, but the shape of the side wall 19 of the valve insert 12 is substantially cylindrical even in this case, and the support element 10 and the valve insert 12 fit with each other. The formation of the gaps leads to the closing of the valve flaps 15. Closed valve flaps 15 are illustrated by solid lines in the respective figures. Section lines A-A and B-B are indicated in FIG. 6A.

Figure 6B:
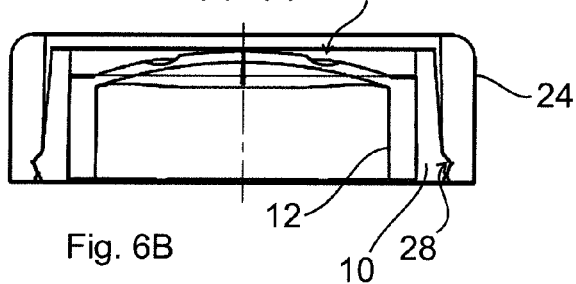
FIG. 6B is a sectional view of the embodiment of FIG. 5A taken along section line A-A.

The cross section taken along section line A-A of of FIG. 5A is shown in FIG. 6B. It is shown in the figure that a groove 28 adapted for receiving the flange 20 of the support element 10 is formed in the receiving element 24. The groove 28 is formed on the whole periphery of the inner side of the receiving element 24. FIG. 6B shows that the flange 20 is received by the groove 28. Closing of the valve flaps 15 is also illustrated in FIG. 6B. FIG. 2B shows that the upper edge of of the side wall 19 is horizontal, and FIG. 2B also shows that there is a gap between the valve flaps, i.e. the slits 14 are opened. On the contrary, it is illustrated on FIG. 6B that the upper edge of the side wall 19 is not horizontal; it is sloping a bit towards the centre (the figure shows a horizontally symmetric deformation). It is also shown in FIG. 6B that the slits 14 are closed when the valvular closure element 5 is inserted into the receiving element 24.

Figure 6D:
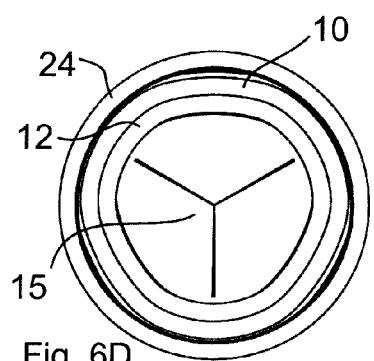
FIG. 6D is a bottom view of the embodiment of FIG. 5A.
Figure 6C:
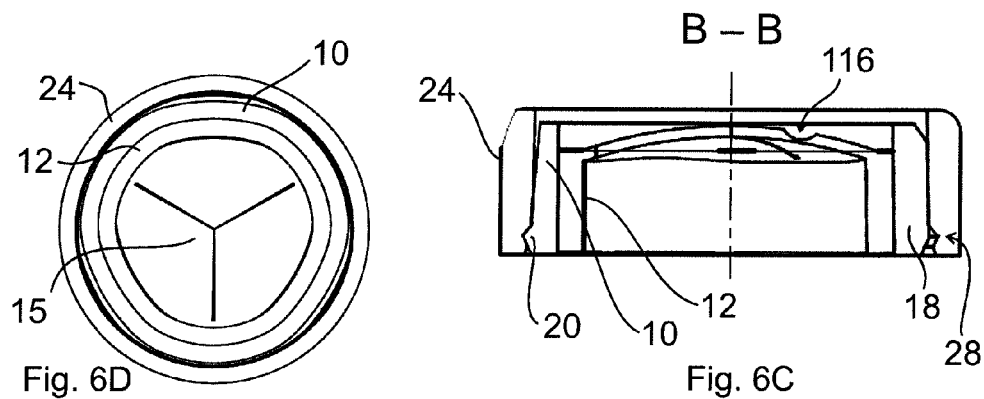
FIG. 6C is a sectional view of the embodiment of FIG. 5A taken along section line B-B.

The sectional view of FIG. 6A taken along section line B-B is shown in FIG. 6C. It is illustrated in FIG. 6C that the groove 28 of the receiving element 24 does not receive the bottom part of the projection 18. The difference between the structure of a projection 18 and other general periphery parts of the support element 10 (where the flange 20 is formed) results in the effect that the valve flaps 15 become closed when the valvular closure element 5 is inserted in the receiving element 24. In the periphery parts where the flange 20 is formed, the flange 20 is received by the groove 28 and the remaining part of the surface of the outer periphery abuts to the inner wall of the receiving element 24. At a projection 18, the groove 28 cannot receive any part of the support element 10, therefore the support element 10 is pushed inward at a projection 18 by the receiving element. The larger width of the support element 10 at a projection 18 enhances this effect. FIG. 6C also shows that the valve flaps 15 are closed when the valvular closure element 5 is inserted into the receiving element 24.

In FIG. 6D the combination of FIG. 6A is shown from the bottom. The deformation of the valvular closure element 5, and the formation of small gaps at the projections 18, i.e. at the middle of the adjoining periphery of a valve flap 15 are also illustrated in this figure. Valve flaps 15 are closed in FIG. 6D.

Some embodiments of the invention relate to a closure cap. An embodiment of the closure cap according to the invention is shown in FIGS. 7A and 7B. The closure cap 30 according to the invention comprises a receiving element 36, and a valvular closure element according to the above described embodiments of the invention; said valvular closure element 5 being inserted into the receiving element 36. It is shown in FIG. 7A that the receiving element 36 is very similar to the receiving element 24 illustrated in FIGS. 5A to 6D. The only difference is that the receiving element 36 comprises a flange projecting inwardly from the top. The closure cap shown in FIG. 7A is in particular adapted for closing a container containing a liquid.

The closure cap 30 shown in FIGS. 7A and 7B comprises, besides the receiving element 36, a cover 31 covering the top part of the closure cap; the receiving element 36 is formed in this top part. The closure cap 30 further comprises a neck 32 which is adapted for screwing the closure cap 30 onto an appropriately configured opening of a container. The closure cap 30 also comprises a skirt 34; the neck 32 and the skirt 34 are configured to enable appropriate connection of the closure cap onto a container. The cover 31 is connected to the top part of the closure cap 30 e.g. with a hinged joint and the cover 31 fixes in its closing position e.g. with a snapping connection.

The steps of inserting the valvular closure element 5 into the closure cap 30 are illustrated in FIGS. 7A and 7B. The groove 28 is formed in the internal periphery of receiving element 36. FIG. 7B shows the inserted position of the valvular closure element 5 in the closure cap 30. It is clear from FIG. 7A that the groove 28 has the same structure at any point of the internal periphery of the receiving element 36 or 24. The valvular closure element 5 can be inserted into the receiving element 36 in every rotational position of the valvular closure element 5. There is no restriction for the rotational position of the projections 18. To summarize, the insertion of the valvular closure element 5 into the closure cap 30 does not need rotational positioning.

The groove on the internal periphery of the receiving element is optional. Closing of the valve flaps is also achieved by inserting the valvular closure element 5 into a receiving element having no internal structure, i.e. only a plain cylindrical inner surface. In this case, no flange is needed to be formed on the support element 10; the formation of projections on the external surface of the support element 10, i.e. the enlarged wall width at the projections will also result in closing of the valve flaps when the valvular closure element is inserted into the receiving element (both of them are configured as detailed hereabove).

A combination slightly different from the combination of FIGS. 5A to 6C is shown in FIG. 8A from above. In this combination, the valvular closure element 5 is inserted into receiving element 36 as shown in FIG. 7A. A rim 37 of the receiving element 36 hides the support element 10 in the top view of FIG. 8A. In FIG. 8A section lines A-A and B-B are indicated. FIGS. 8B and 8C show the combination of FIG. 8A in sectional views taken along section lines A-A and B-B, respectively.

The invention also relates to an apparatus for manufacturing the valvular closure element according to the invention. The apparatus according to the invention comprises a first mould cavity 64 for producing a support element 10 by injection moulding, and a second mould cavity 72 for producing a valve insert 12 by injection moulding from a resilient material. The first mould cavity 64 and the second mould cavity 72 are illustrated in FIGS. 10 and 12, respectively. The support element 10 and the valve insert 12 is configured as introduced above, therefore the first mould cavity 64 is adapted for forming projections 18 on the external periphery of the support element 10 at the middle of the adjoining periphery of the valve flaps 15, and the second mould cavity 72 is adapted for giving a cylindrical shape for the side wall 19, and for forming the slits 14 substantially in radial direction. Moreover, the first mould cavity 64 is configured so that the support element 10 obtains an annular shape by the injection moulding, and the second mould cavity 72 is configured so that the valve insert 12 have the side wall 19 and the cover portion 17, is abutting to an internal surface of the support element 10 by its side wall 19, wherein said cover portion 17 is formed with slits 14 defining valve flaps 15, as detailed above. All of FIGS. 9A to 16B show sectional views of the apparatus according to the invention.

Figure 9A:
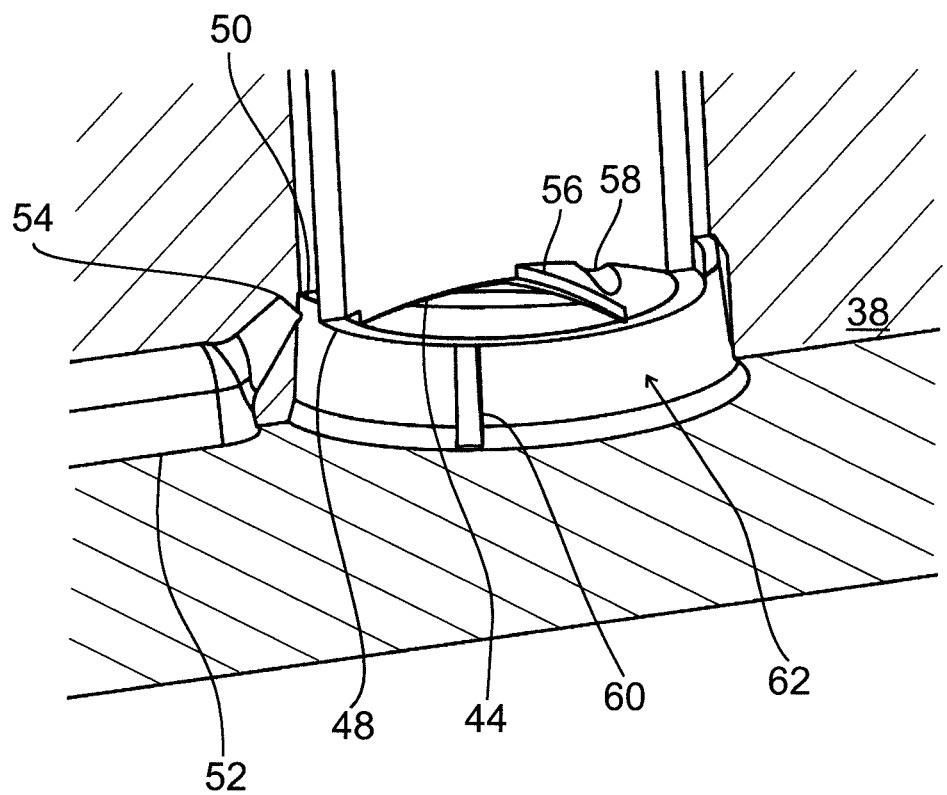
FIG. 9A is a sectional view of a top part of an embodiment of the apparatus according to the invention implementing an embodiment of the method according to the invention.
Figure 9B:
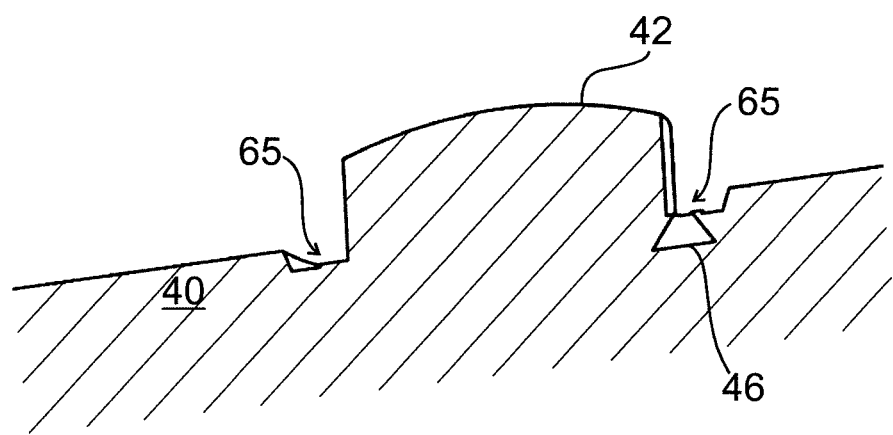
FIG. 9B is a sectional view of the bottom part of an embodiment of the apparatus according to the invention implementing an embodiment of the method according to the invention.
Figure 10:
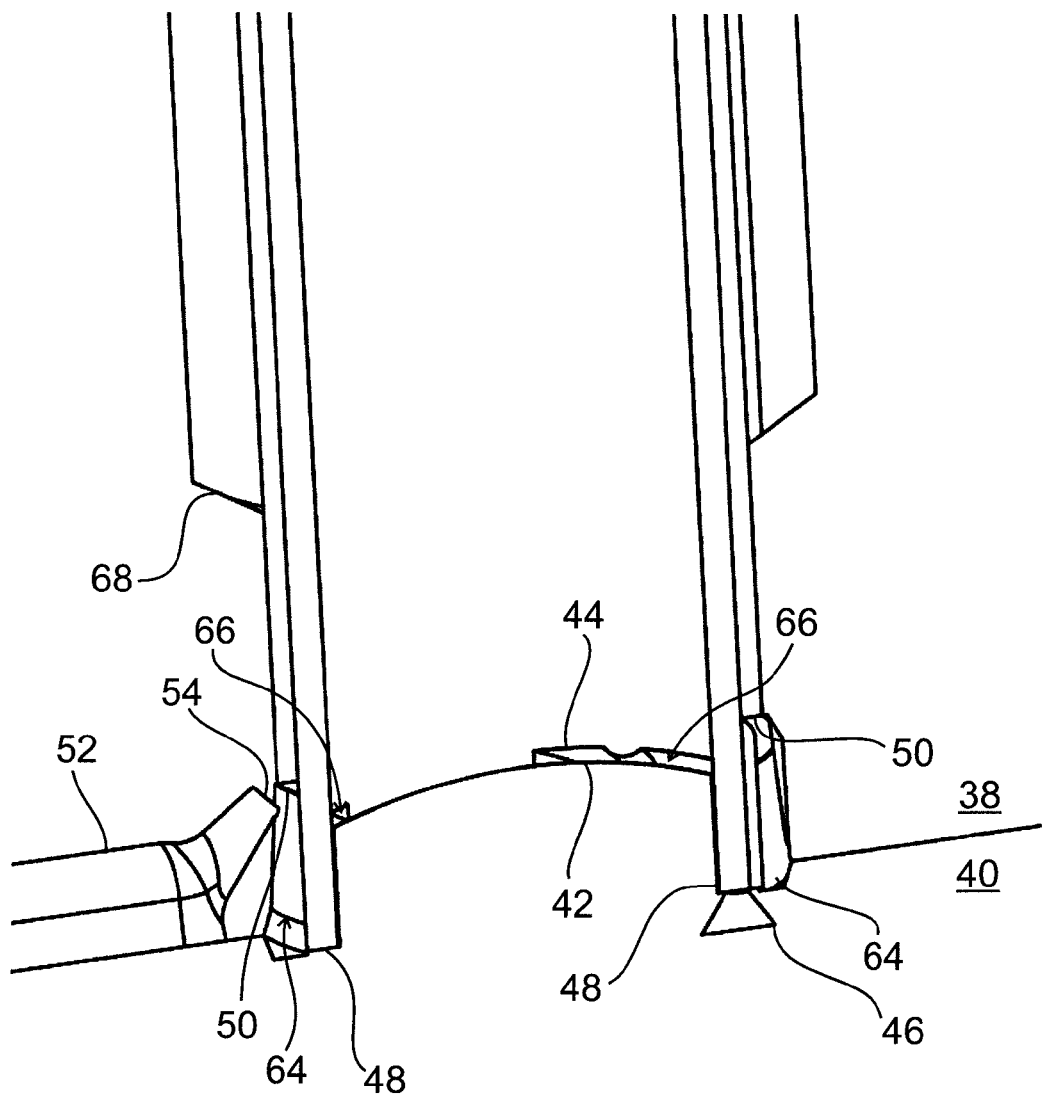
FIG. 10 is a sectional view of the embodiment of the apparatus of FIGS. 9A and 9B implementing the step of forming a first mould cavity in an embodiment of the method according to the invention.

In FIGS. 9A and 9B an embodiment of the apparatus according to the invention is shown. The apparatus is shown in a starting configuration, i.e. before the start of a method of manufacturing an embodiment of the valvular closure element according to the invention. The present embodiment of FIGS. 9A and 9B comprises a first casting mould 38 (the upper casting mould shown in a bottom spatial view in FIG. 9A, the so-called cavity side mould), and a second casting mould 40 (the lower casting mould shown in a side view in FIG. 9B, the so-called core side mould). The apparatus further comprises a first movable tube 50 adapted for pushing out the support element 10 from the apparatus. The first movable tube 50 is located within the first casting mould 38, and it is movable vertically according to the figure. A second movable tube 48 for shaping the internal periphery of the support element 10 is also comprised in the apparatus, concentrically within the first movable tube 50.

In the first casting mould 38 an injection moulding inlet 52 (called runner in the relevant art) is located, and an inlet end 54 (called gate in the relevant art) of the injection moulding inlet 52 is at the periphery of a forming space 62 which is adapted for forming the elements—i.e. the support element 10 and the valve insert 12—of the valvular closure element 5 with the help of the movable tubes 48, 50. The first casting mould 38 has an indentation 44 located within the tubes 48, 50 concentrically. The lower surface of the indentation 44 is formed to be adapted for forming the valve flaps 15 from the top, i.e. for forming the slits 14 between the valve flaps 15, therefore projections 56, 58 are located on the indentation 44. In the first casting mould 38 side indentations 60 are also formed adapted for forming the projections 18 when the support element 10 is injection moulded.

On the second casting mould 40 a projection 42 (called core in the relevant art) is formed. The projection 42 delimits the valve insert during the injection moulding thereof, as it will be illustrated in consecutive figures below. There is also a groove 65 in the second casting mould 40; the lower part of the support element 10 and the valve insert is confined and received in the groove 65 during the injection moulding steps thereof. An injection moulding inlet 46 is formed on the bottom side of the groove 65. The inlet 46 is positioned to be adapted for feeding the injection moulding material during the step of injection moulding.

The invention also relates to a method for manufacturing the valvular closure element according to the invention. The steps of an embodiment of the inventive method are illustrated in FIGS. 9A to 15. The method is carried out by the apparatus according to the invention disclosed above. The method according to the invention comprises the following steps. The support element 10—having an annular shape—is produced in the first mould cavity 64 (illustrated in FIG. 10) by injection moulding. Furthermore, the valve insert 12—being made of a resilient material, having a side wall 19 and a cover portion 17, and abutting to an internal surface of the support element 10 by its side wall 19, and having a cover portion 17 formed with slits 14 defining valve flaps 15—is produced in the second mould cavity 72 (illustrated in FIG. 12) by injection moulding. In the first mould cavity 64 a projection 18 is formed on the external periphery of the support element 10 for each valve flap 15 at the middle of the adjoining periphery corresponding to the respective valve flap 15, and in the second mould cavity 72 a cylindrical shape is formed for the side wall 19, and the slits 14 are formed radially.

During the first step of the method of manufacturing the valvular closure element, i.e. before the production of the support element 10, the first mould cavity has to be configured in the apparatus responsible for the manufacturing. In the illustrated embodiment of the apparatus, this is done in the following way. The first casting mould 38 and the second casting mould 40 are pressed to each other and the second movable tube 48 is pushed to the second casting mould 40. Therefore, the second movable tube 48 in this position is adapted for shaping the internal periphery of the support element 10 as illustrated in the figure. As shown in FIG. 10 the first mould cavity 64 is confined by the first casting mould 38 (by the external side of the cavity 64) and the second casting mould 40 (partly by the external side and bottom of the cavity 64), the first movable tube 50 (by the top of the cavity 64 to form the end-ring of the support element), and the second movable tube 48 (by the inner periphery of the cavity 64). The lower end-ring of the support element is formed, i.e. shaped by the second casting mould 40. In FIG. 10 a moving machine 68 for moving at least one of the tubes 48, 50 is shown and a space 66 is illustrated which is for the valve flaps 15 injection moulded in a subsequent step.

Figure 11:
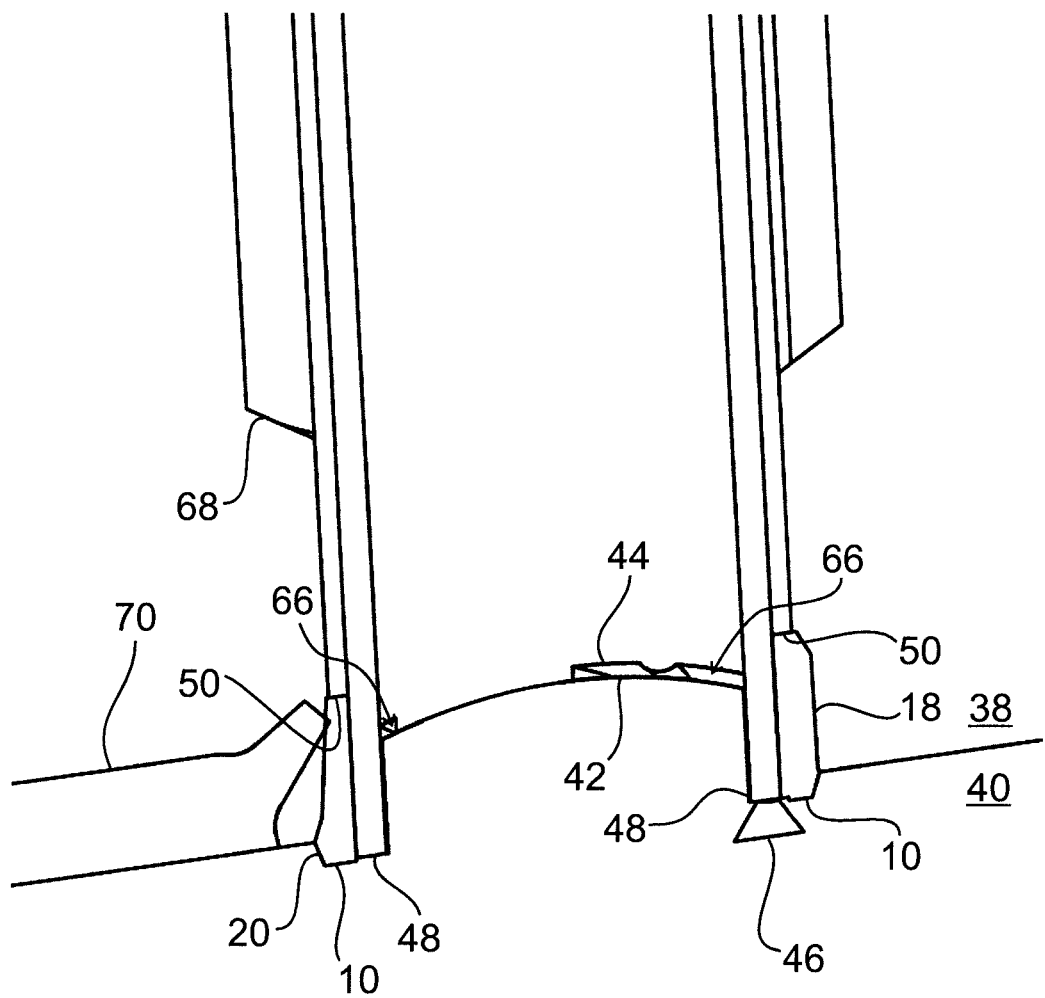
FIG. 11 is a sectional view of the embodiment of the apparatus of FIGS. 9A and 9B implementing the step of producing a support element by injection moulding in an embodiment of the method according to the invention.
Figure 12:
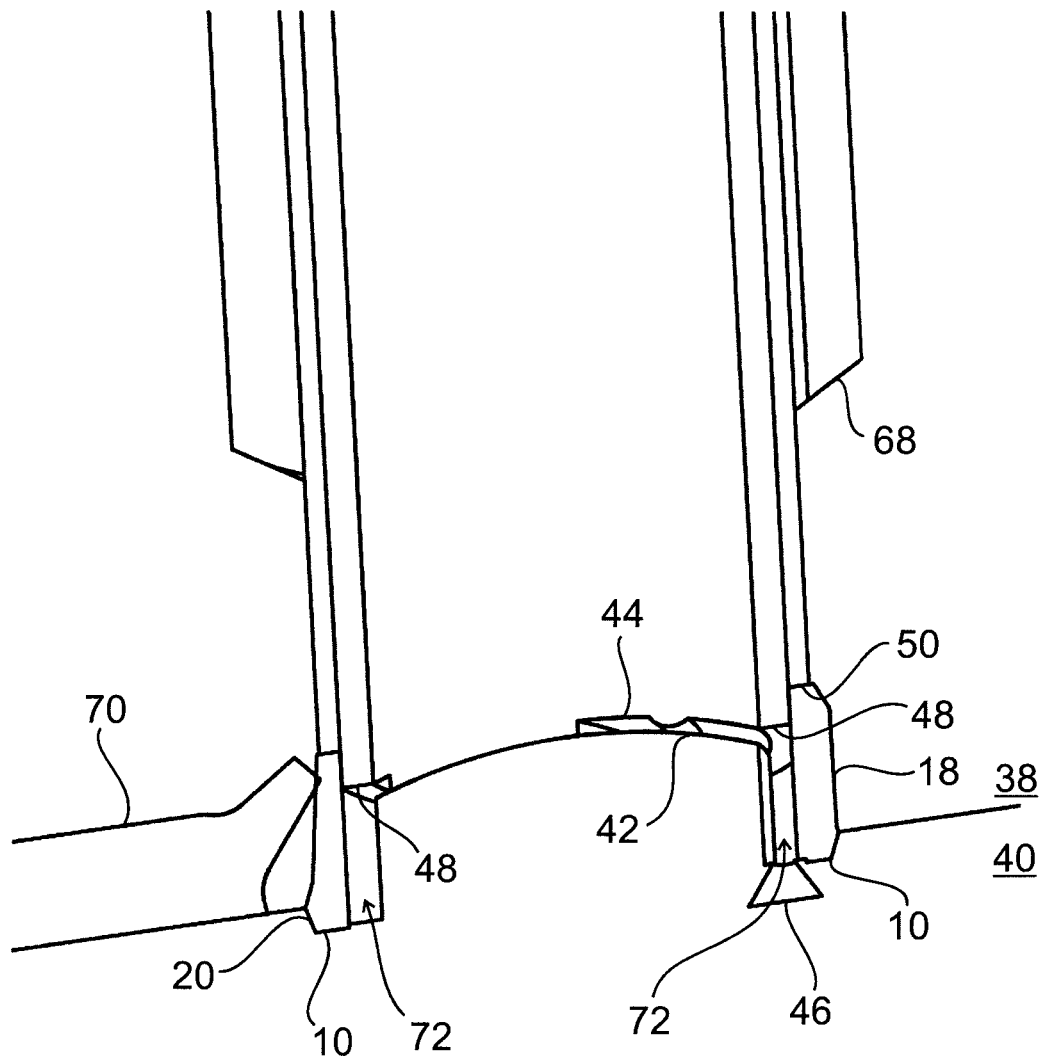
FIG. 12 is a sectional view of the embodiment of the apparatus of FIGS. 9A and 9B implementing the step of forming a second mould cavity in an embodiment of the method according to the invention.

As illustrated in FIG. 11, the support element 10 is injection moulded through the injection moulding inlet 52. It is shown in FIG. 11 that the support element 10 has been injection moulded, therefore the first mould cavity 64 is filled with the material of the support element 10. The first mould cavity 64 constitutes a contiguous space, therefore the support element 10 can be injection moulded through only one inlet, but the application of more inlets is also conceivable. The injection moulding inlet 52 is also filled with material, therefore a stick of barb 70 is connected to the internal periphery of the support element 10.

In the next step the production of the valve insert 12 follows, i.e. the second mould cavity 72 has to be configured by moving a second movable tube 48—according to the figure—upwards. FIG. 12 shows that the tube 48 has to be moved in the present embodiment of the apparatus until a position where the top of the cover portion 17 of the valve insert 12 is desired to be located. This position is defined by the position of the indentation 44 of the first casting mould 38, in which the negative shape of the valve flaps 15 is formed. Therefore, the topmost part of the indentation gives the position of the tube 48 as shown in FIG. 12. It is also shown in this figure that the injection moulding inlet 46 is located so that the injection moulding of the valve insert 12 can be done therethrough.

To summarize, the second mould cavity 72 is confined by the following apparatus parts: the support element 10 for shaping the external periphery of the side wall 19, the second movable tube 48 retracted for shaping the cover portion 17, a side wall of a projection 42 of the second casting mould 40 for shaping the internal periphery of the side wall 19, and the top of the projection 42 and an indentation 44 of the first casting mould 38 adapted for forming with slits 14 defining valve flaps 15.

Figure 13:
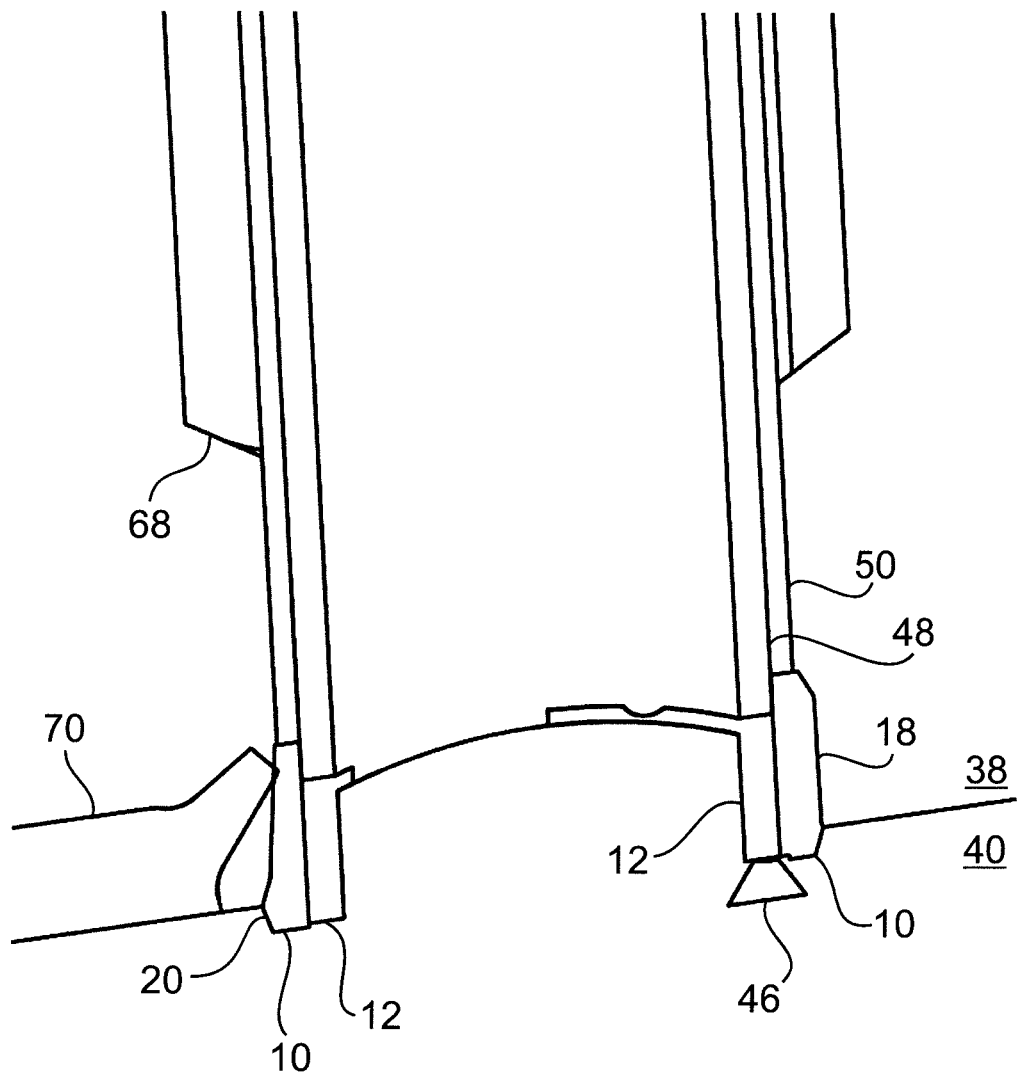
FIG. 13 is a sectional view of the embodiment of the apparatus of FIGS. 9A and 9B implementing the step of producing a valve insert by injection moulding in an embodiment of the method according to the invention.

In FIG. 13 the injection moulding of the valve insert 12 is illustrated; in this figure the second mould cavity 72 is filled with the material of the valve insert 12. The second mould cavity 72 constitutes a contiguous space, therefore the valve insert 12 can be injection moulded through only one inlet, but in a preferred embodiment injection moulding is done through more inlets.

In the illustrated embodiment the support element 10 and the valve insert 12 are produced in the same apparatus, and the support element 10 remains in production position of it during the production of the valve insert 12, i.e. the support element 10 is not displaced after its production. Avoiding displacement is highly advantageous since it is necessary for the support element 10 and the valve insert 12 to be positioned with respect to each other. If they are made in the same apparatus without the displacement of the support element 10 before the production of the valve insert 12, no positioning is needed during the production of the valvular closure element. Positioning is meant to be a general positioning (i.e. finding the right place of an article for the next step of manufacturing) and also meant to be a rotational positioning. The rotational positioning of the support element 10 and valve insert 12 with respect to each other is necessary for proving the valvular closure element according to the invention.

In the above detailed preferred embodiment, i.e. in the embodiment where the support element 10 is not displaced before the injection moulding of the valve insert 12, the valve insert 12 is produced before total solidification of the support element 10, i.e. when it is melted at least to some extent. If the manufacturing of the valve insert 12 is carried out in this way, the support element 10 and the valve insert may attach to each other as a consequence of the simultaneous solidification. Fitting of the support element 10 and the valve insert 12 is needed in all of the embodiments of the valvular closure element. If the support element 10 and the valve insert 12 are attached to each other by the simultaneous solidification, the fitting of them is ensured and improved.

Figure 14A:
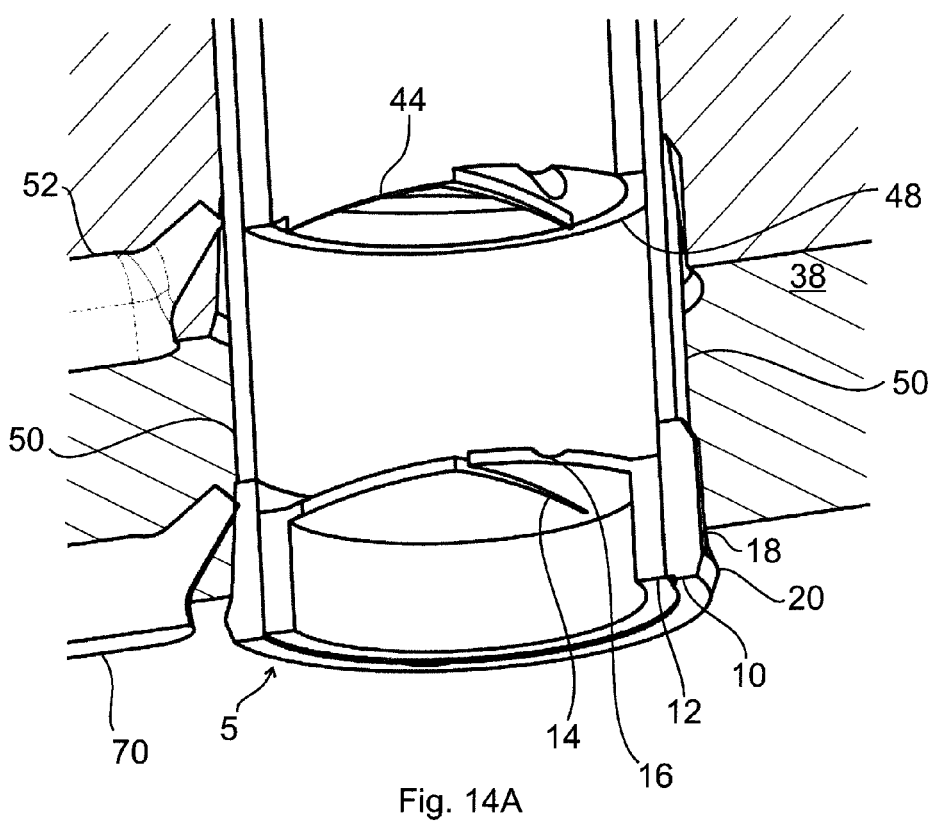
FIG. 14A is a sectional view of the top part of the embodiment of the apparatus of FIGS. 9A and 9B implementing the step of pushing out the valvular closure element from the manufacturing apparatus.
Figure 14B:
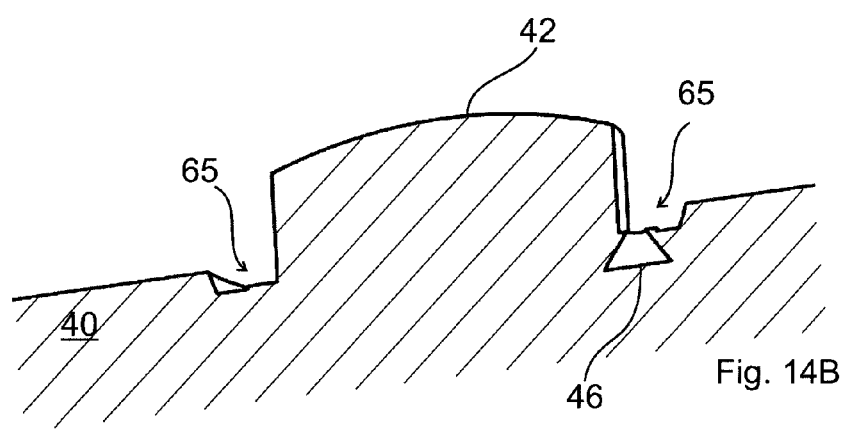
FIG. 14B is a sectional view of the bottom part of the embodiment of the apparatus of FIGS. 9A and 9B implementing the step of pushing out the valvular closure element from the manufacturing apparatus.

In FIGS. 14A and 14B a step of a preferred embodiment of the method according to the invention is illustrated. In this step, after producing the valve insert 12, the valvular closure element 5 is pushed out from first mould cavity 64 and the second mould cavity 72, i.e. from the union thereof, which is the forming space 62 illustrated on FIG. 9A, by means of the first movable tube 50.

In FIGS. 14A and 14B it is illustrated that the whole valvular closure element 5 is pushed out from its production position. The support element 10 of the valvular closure element is pushed by means of the tube 50 after removing the second casting mould 40. It is practical to push out the valvular closure element 5 by means of tube 50, since the support element 10 is made of a harder material than the valve insert 12. As a consequence of the proper fitting of valve insert 12 into the support element 10, the valve insert 12 can be detached from the indentation 44. Appropriate detach is even more ensured if the support element 10 and the valve insert 12 solidifies parallel in time.

In FIG. 14A it is also illustrated that the stick of barb (sprue) 70 comes out from the inlet 52, therefore it can be broken easily—breaks by itself—from the support element 10. It is also clear from FIGS. 14A and 14B that the inlet 52 is confined by the second casting mould from its bottom.

Figure 15A:
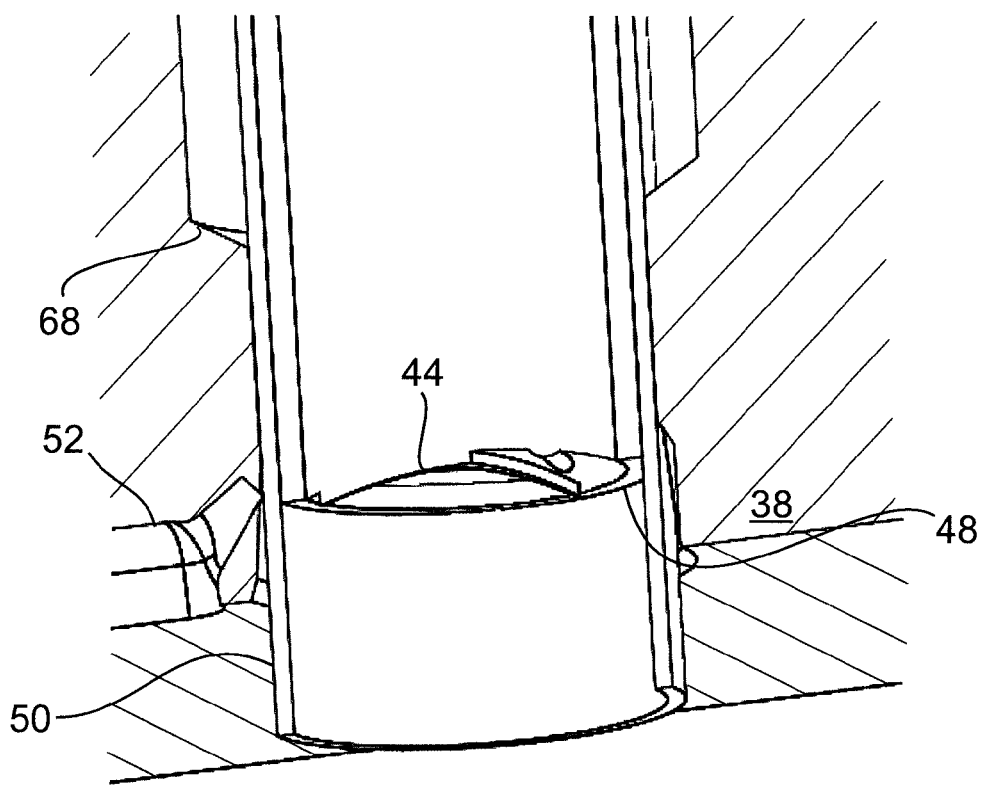
FIG. 15A is a sectional view of the top part of the embodiment of the apparatus of FIGS. 9A and 9B after the step of pushing out the valvular closure element.
Figure 15B:
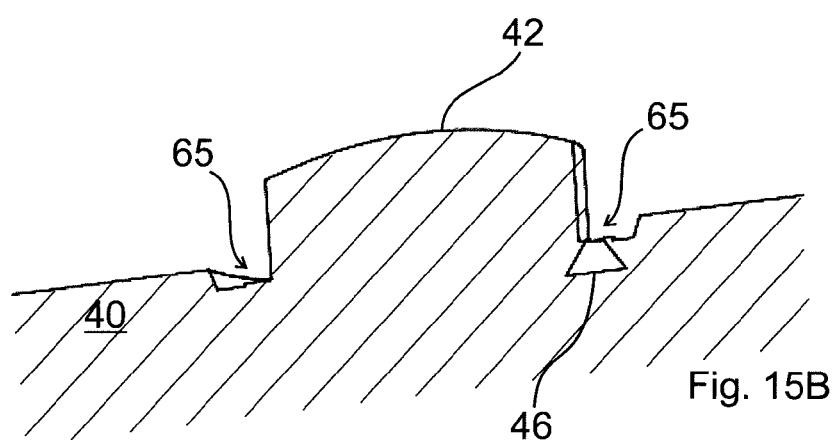
FIG. 15B is a sectional view of the bottom part of the embodiment of the apparatus of FIGS. 9A and 9B after the step of pushing out the valvular closure element.

FIGS. 15A and 15B shows the end position of the apparatus according to the invention, i.e. after manufacturing of the valvular closure element, when it is ejected from the apparatus.

Figure 16A:
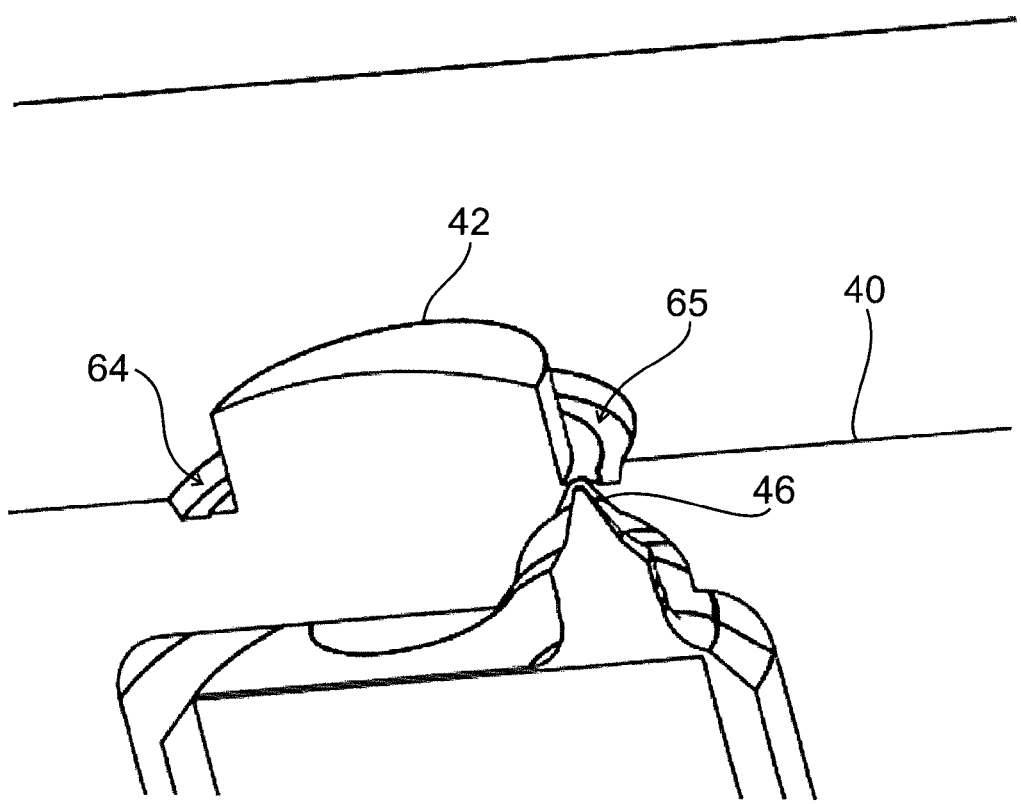
FIG. 16A is a top view of an injection mould inlet in an embodiment of the apparatus for manufacturing the valvular closure element.
Figure 16B:
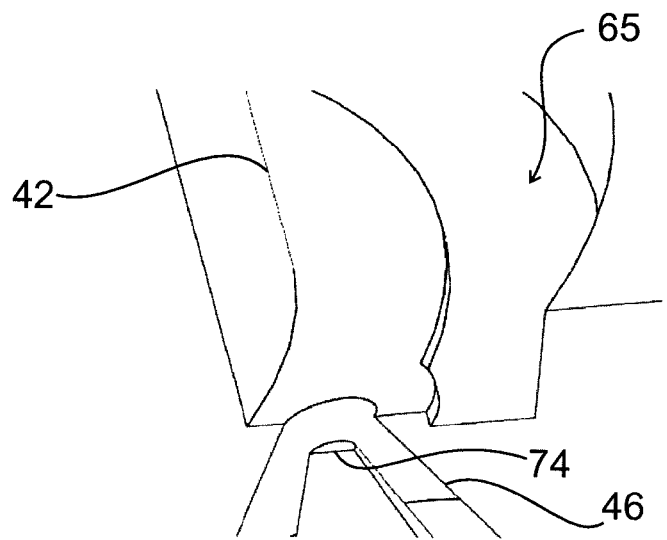
FIG. 16B shows a detail of FIG. 16A.

In FIG. 16A a detailed view of the injection moulding inlet 46 of the material of the valve insert is shown. In this figure the second casting mould 40 is shown from the top, therefore it is also clear from the figure, that the projection 42 has a circular shape. The groove 65 encircling the projection 42 is also shown from the top, it is shown—especially in FIG. 16B—that a small step is formed within the groove 65 at the border of the first moulding cavity 64 and the second moulding cavity 72. In FIG. 16B a detailed view of a part of FIG. 16A is shown. Tip 74 of the inlet 46 is also shown in this figure.

Figure 17:
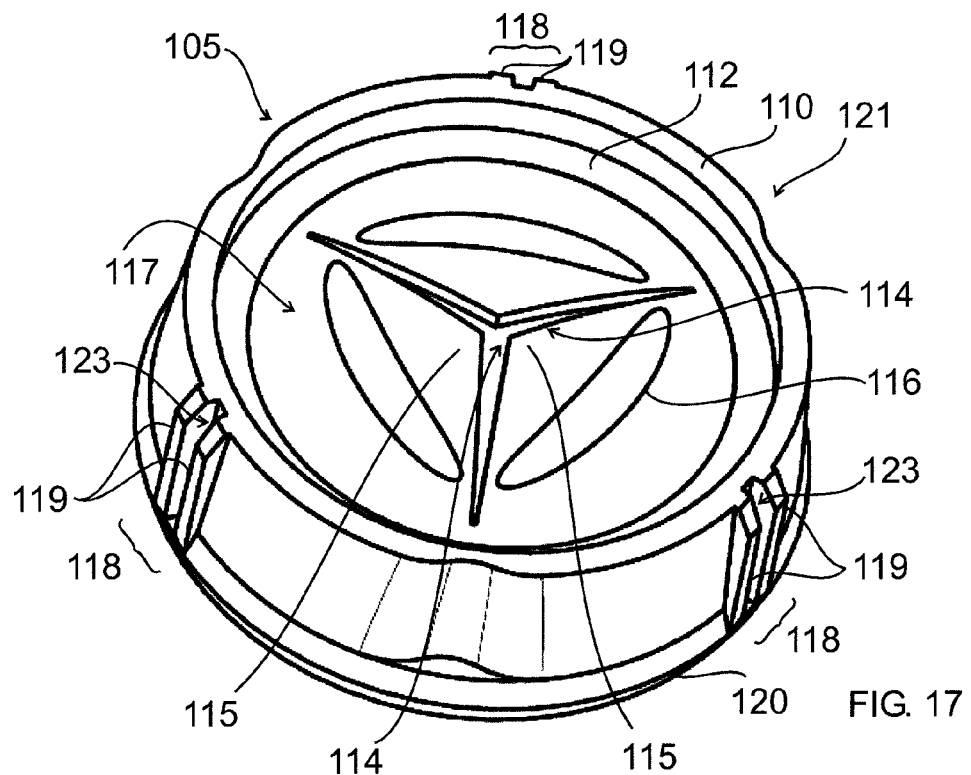
FIG. 17 shows another embodiment of the valvular closure element according to the invention in a spatial top view.

In FIG. 17 a further embodiment of the valvular closure element according to the invention is shown. Valvular closure element 105 comprises a support element 110 and a valve insert 112. The valve insert 112 has a side wall (not indicated by a reference number) and a cover portion 117. The cover portion 117 is formed with slits 114 defining valve flaps 115. In this embodiment a flange 120 is formed on the external periphery of the side wall.

In the embodiment of FIG. 17, the valvular closure element 105 comprises a projection 118. The projection 118 comprises two separated projection pieces 119 and is formed on the external periphery of the support element 110. The projection 118 is, therefore, wider than the projection 18, which leads to a more efficient inward push as a consequence of the wider pressing surface. Furthermore, in the present embodiment, the projection pieces 119 are separated with a recess 123 having larger height than the radial height of the projection pieces 119. The projection 118 and the projection pieces 119 have a radial height being equal to the height by which they are projecting out from the annular support element 110. The projection having two projection pieces 119 and a recess 123 therebetween is more preferably than the projection 18 of the embodiment of FIG. 1, since projection pieces can tilt towards each other; the rigidity of a two piece projection 118 is advantageously smaller than the rigidity of a one piece projection with the same width which improves the pushing effect. By means of a two piece projection also material can be saved compared to the one piece projection. Therefore, using the projection 118, the corresponding valve flap 115 can be pushed inward more efficiently, i.e. the closing of the slits is better, when the valvular closure element 105 is inserted into a receiving element.

In the embodiment of FIG. 17, weakening recesses 121 are formed in the support element 110 at a joining part of two neighbouring valve flaps 115, i.e. the weakening recessed are formed on the support element 110 near the area where two neighbouring valve flaps connect to each other. The weakening recesses 121 also help to improve the closing of the slits 114.

Figure 18:
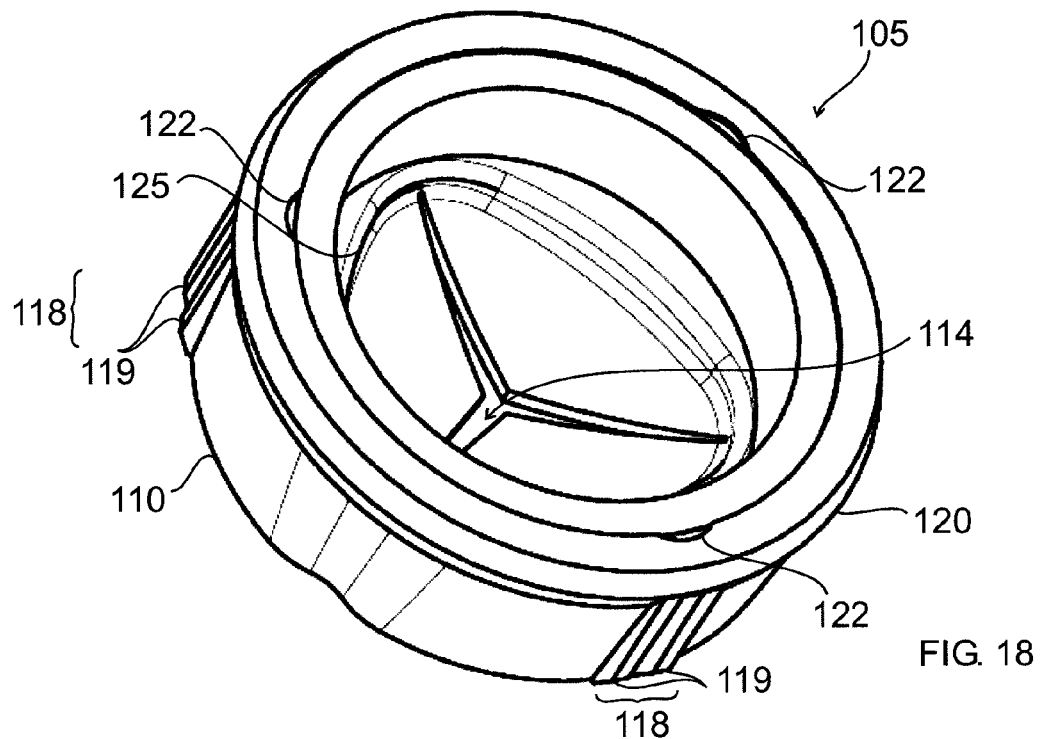
FIG. 18 shows the embodiment of FIG. 17 in a spatial bottom view.

In FIG. 18 the valvular closure element 105 is shown in a bottom view. In this bottom view, it can be seen, that, in the present embodiment, the side wall of the valve insert 112 is thickened at a connection line of the side wall and the cover portion 117 near the middle of the adjoining periphery of the valve flaps 115. The thickening shown in FIG. 18 leads to a more efficient turning of the valve flaps, when the valvular closure element 105 is inserted into the receiving element of a closure cap.

Figure 19A:
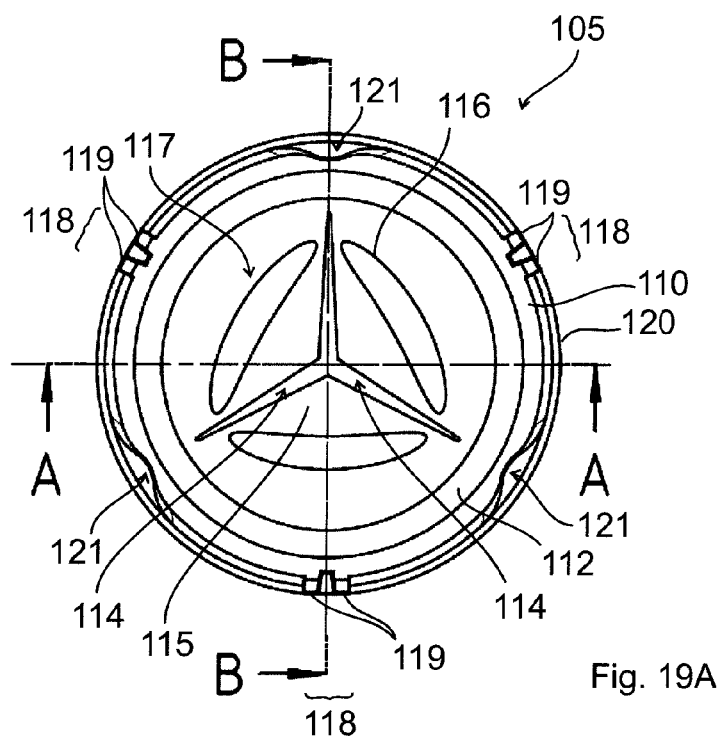
FIG. 19A shows the embodiment of FIG. 17 in a top view indicating section lines A-A and B-B.
Figure 19B:
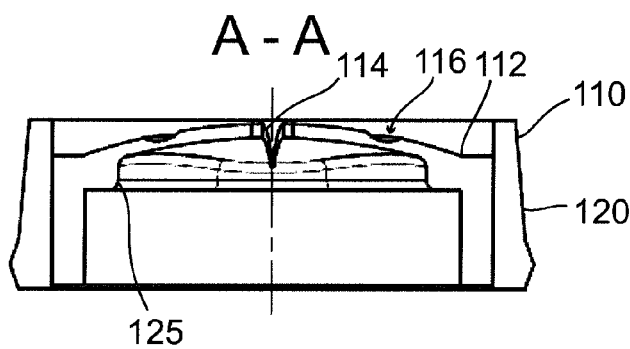
FIG. 19B is a sectional view of the embodiment of FIG. 17 taken along section line A-A.
Figure 19C:
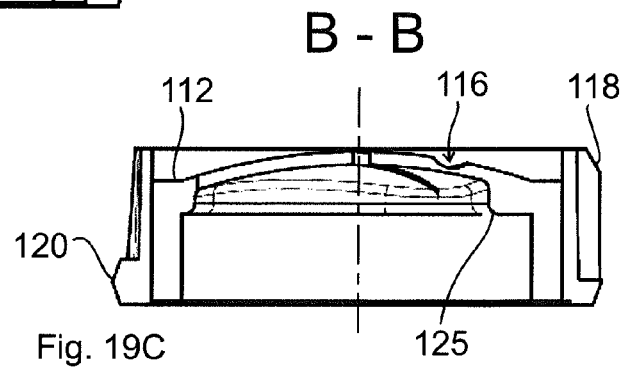
FIG. 19C is a sectional view of the embodiment of FIG. 17 taken along section line B-B.

In FIG. 19A the embodiment of FIG. 17 is shown in a top view. In this view, all of the projection pieces 119 and the weakening recesses 121 can be seen, and it is also clear that the height of the recess 123 is larger than the height of the projection pieces 119. Section lines A-A and B-B are indicated in FIG. 19A. In FIG. 19B the section view of the embodiment of FIG. 17 can be seen taken along section line A-A. Thickening 125 of the side wall is shown in FIG. 19B both in the right hand side and the left hand side of the picture, since section line A-A intersects the valve insert 112 near the middle of the adjoining periphery of the valve flaps 115. Section line B-B intersects the valvular closure element 105 along a slit 114. Therefore, the width of thickening 125 in the right hand side of FIG. 19C is larger than the width of the thickening 125 of FIG. 19B. The side wall has also no thickening at the left hand side of FIG. 19C, since this point of the periphery of the side wall is furthest from the middle of the adjoining periphery of the valve flap 115, i.e. this point is at the end of a slit 114 as it is shown in FIG. 19A. The thickening 125 plays a role during the use of the container to which the valvular closure element 105 can be attached; the thickening 125 determines the line of deformation of the valve flaps 115, therefore improves the operation of the valvular closure element 105 during use.

Deterioration of the valve insert in the valvular closure element according to the invention is avoided by the support element, since the support element is preferably made of a harder material than the valve insert, therefore the valve insert can be protected from damage by means of the support element. In a preferred embodiment, the support element and the valve insert is produced in the same apparatus, the support element surrounds and protects the valve insert from the very beginning of its production.

Other embodiments of the invention—shown in FIGS. 20A to 37B—relate to another type of valvular closure element, i.e. valvular closure element 205 and 305. In the embodiment of FIGS. 20A to 28B and FIG. 29A to 37B, the valvular closure element 205 and 305 comprise an annularly shaped receiving element 236 and 336, and a valve insert 212 and 312, respectively. The valve inserts 212 and 312 have a side wall 219 and 319, and a cover portion 217 and 317, respectively. The valve inserts 212, 312 are made of a resilient material, and abutting to an internal surface of the receiving element 236, 336 by their side wall 219, 319. The cover portions 217, 317 are formed with radially extending slits 214, 314 defining valve flaps 215, 315. Each valve flap 215, 315 has an adjoining periphery connected to the side wall 219, 319. The adjoining periphery extends preferably along an arched line at the connection of a valve flap 215, 315 to the side wall 219, 319, as it can be observed e.g. in FIGS. 20A and 29A.

The receiving elements 236 and 336 are made of a harder material than the valve inserts 212 and 312, similarly to the relation of the materials of the valve inserts 12 and 112 and support elements 10 and 110. The receiving elements 236 and 336 have a hardness similar to that of the receiving elements 24 and 36. The receiving elements 24, 36, 236 and 336 may be preferably harder than the support elements 10, 110.

In these embodiments, for each valve flap 215, 315, the internal periphery of the receiving element 236, 336 is formed with larger radius of curvature at the middle of the adjoining periphery than at the slits 214, 314. The difference in the radii of curvature along the adjoin periphery is most characteristically observable in FIGS. 27 and 36. Closing of the slits 214, 314 are caused by this structure of the internal periphery of the receiving element 236, 336, as will be detailed in connection with FIGS. 27 and 36. The valvular closure element is very easy to assemble in these embodiments. As it is illustrated in FIGS. 21 to 23, as well as in FIGS. 30 to 32, the valve insert only has to be inserted into the receiving element, and the valvular closure element is ready to use. Therefore, these embodiments of the valvular closure element according to the invention can be and assembled easier and more effective handled than the known valvular closure elements.

Figure 20A:
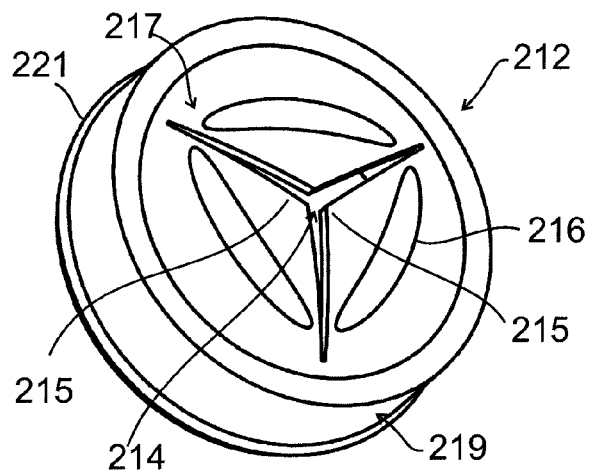
FIG. 20A shows the valve insert of a further embodiment of the valvular closure element according to the invention.

In FIG. 20A, the valve insert 212 of the embodiment illustrated in FIGS. 20A to 28B is shown in a spatial view. In the present embodiment a flange 221 is formed on the external periphery of the side wall 219. In FIG. 20A to 20D the valve insert 212 is shown in its resting state, i.e. before being inserted into the receiving element 336. In this resting state, slits 214 are opened. The side wall 219 and the cover portion 217 are illustrated in FIG. 20A and three valve flaps 215 can be also seen in this picture.

Figure 20B:
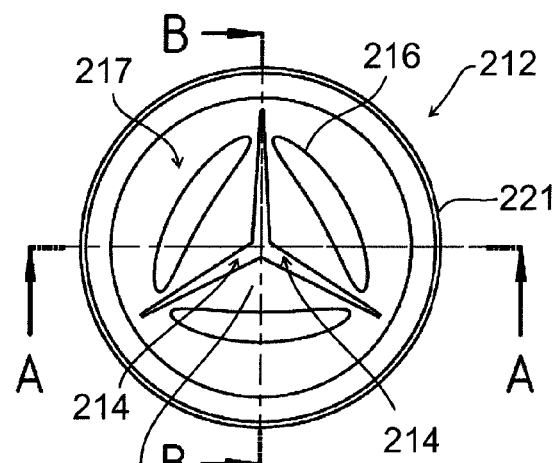
FIG. 20B shows the valve insert of FIG. 20A in an upper view indicating section lines A-A and B-B.
Figure 20C:
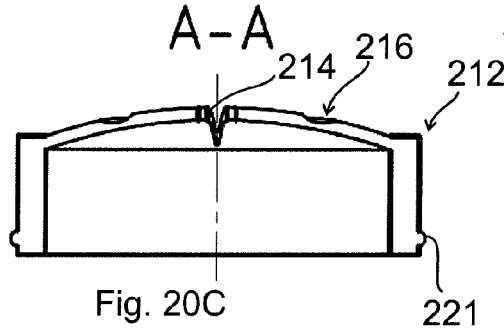
FIG. 20C shows a sectional view of the valve insert of FIG. 20A taken along section line A-A.
Figure 20D:
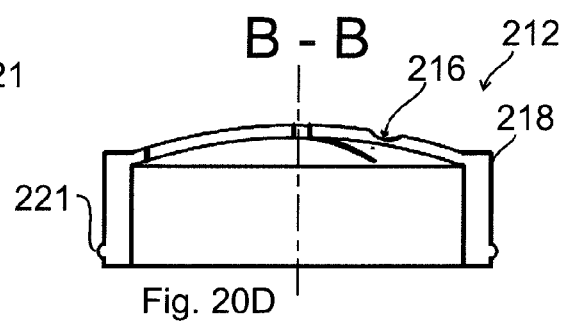
FIG. 20D shows a sectional view of the valve insert of FIG. 20A taken along section line A-A.

In FIG. 20B, the valve insert 212 is shown in a top view, indicating A-A and B-B section lines. In FIGS. 20C and 20D section views of the valve insert 212 are shown along section line A-A and B-B, respectively. The valve insert 212 is very similar to valve insert 12 shown in FIG. 3B, but valve insert 212 comprises the flange 221.

In FIG. 21 the assembly of valvular closure element 205 is illustrated in a spatial top view. It is shown in this figure that, in the present embodiment, a groove 228 is formed on the internal periphery of the receiving element 236 for receiving the flange 221. Furthermore, in the present embodiment a rim 237 of annular shape is formed on the receiving element 236. The rim 237 has an inner radius being smaller than the inner radius of the receiving element 236. The flange 221 and the groove 228 is adapted for fixing the valve insert 212 and the receiving element 236 in respect to each other. The rim 237 enhances this effect, also helps to hold the valve insert 212 in a fixed position, in particular when the valvular closure element 205 is a part of a closure cap, and the closure cap is used for dispensing a liquid from a container. The valve insert 121 can be inserted into the receiving element 236 from its bottom.

In FIGS. 22A and 22B, and FIG. 23 the assembly of valvular closure element 205 is shown in a sectional view and a bottom view, respectively.

Figure 24:
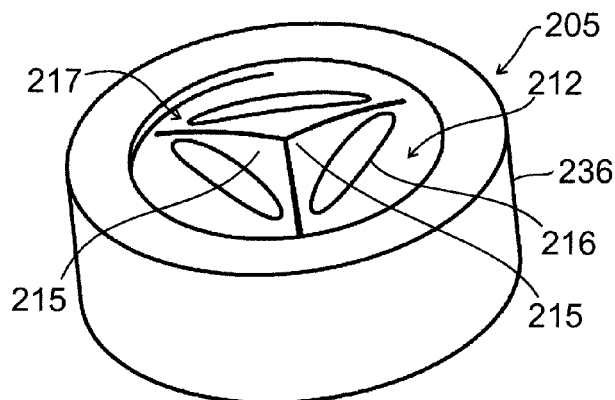
FIG. 24 shows the embodiment of FIG. 21 as assembled in a spatial top view.
Figure 25:
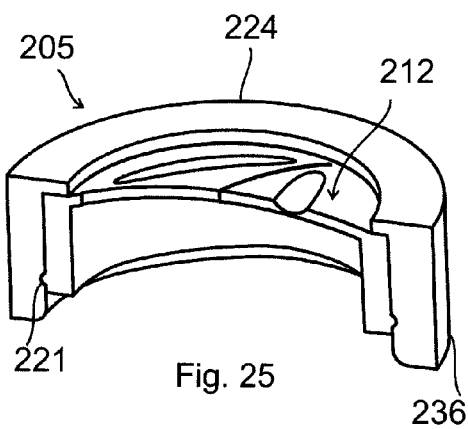
FIG. 25 shows the embodiment of FIG. 21 as assembled in a sectional view.
Figure 26:
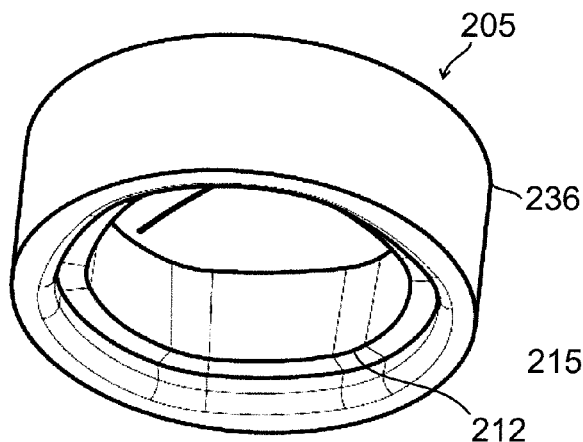
FIG. 26 shows the embodiment of FIG. 21 as assembled in a bottom view.

In FIGS. 24 to 26, the valvular closure element 205 is shown as assembled. It is shown in the figures that the slits 214 are closed when the valve insert 212 is inserted into the receiving element 236. Closing of the slits 214 is caused by the special inner configuration of the receiving element, which is best viewable in FIGS. 21 and 23. The receiving element 236 does not have a circular internal periphery, but a distorted circular internal periphery. The internal periphery of the receiving element 236 has the features as introduced above, i.e. the internal periphery of the receiving element 236 is formed with larger radius of curvature at the middle of the adjoining periphery (central periphery points in the following) than at the slits 214 (side periphery points in the following). The distance between the central axis of the valve insert (i.e. symmetry axis) and the side periphery points is equal to the outer radius of the circular valve insert 212. This radius characterises the valve insert 212 when it is not inserted into the receiving element 236, i.e. when it is in its resting state. The distance between the central axis and the central periphery points is smaller than the outer radius of the valve insert 212, therefore, when the valve insert 212 is inserted into the receiving element 236, the resilient valve insert 212 distorts, which distortion leads to the closing of the slits 214 of the valve insert 212. When the distance between the central axis and the central periphery points is configured appropriately, i.e. the inner periphery of the receiving element 236 has an appropriate shape, total closing of the slits 214 can be achieved by the insertion of the valve insert 212 into the receiving element 236. When the valve insert 212 is inserted into the receiving element 236, the shape of its outer periphery becomes similar to the inner periphery of the receiving element 236, i.e. the valve insert 212 has a distorted circular shape when inserted into the receiving element 236.

Figure 27:
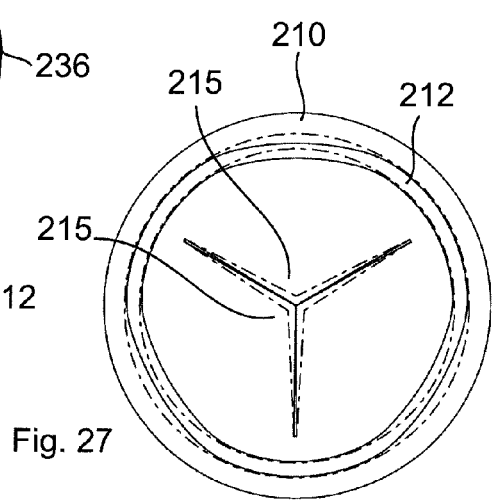
FIG. 27 shows the embodiment of FIG. 21 as assembled in a sectional view.

In FIG. 27 a sectional view of the assembled valvular closure element 205 is illustrated. In FIG. 27 the valvular closure element 205 is cut at half of its height, and it can be seen from the bottom, i.e. the walls of the valve insert 212 and the receiving element 236 can be seen, as well as the cover portion 217 from below. The single lines show the inserted state, i.e. the state when the valve insert 212 is inserted into the receiving element 236. The dashed lines show the rest state of the valve insert 212, i.e. its original state when it is not inserted into the receiving element 236. The contour of the internal periphery of the receiving element 236 determines the shape of the valve insert 212, i.e. deforms it. In FIG. 27 it is shown, that the slits 214 are opened at the rest state of the valve insert and these slits 214 are closed when the valve insert 212 is inserted into the receiving element 236, as a consequence of the deformation of the valve insert 212. It is shown in the figure that the valve flap 215 is pushed inwardly near the middle of the adjoining periphery corresponding to the valve flap 215, and the valve insert 212 fits to the inner periphery of the receiving element 236 at the slits 214. This kind of deformation leads to appropriate closing of the valve flaps 315.

Figure 28A:
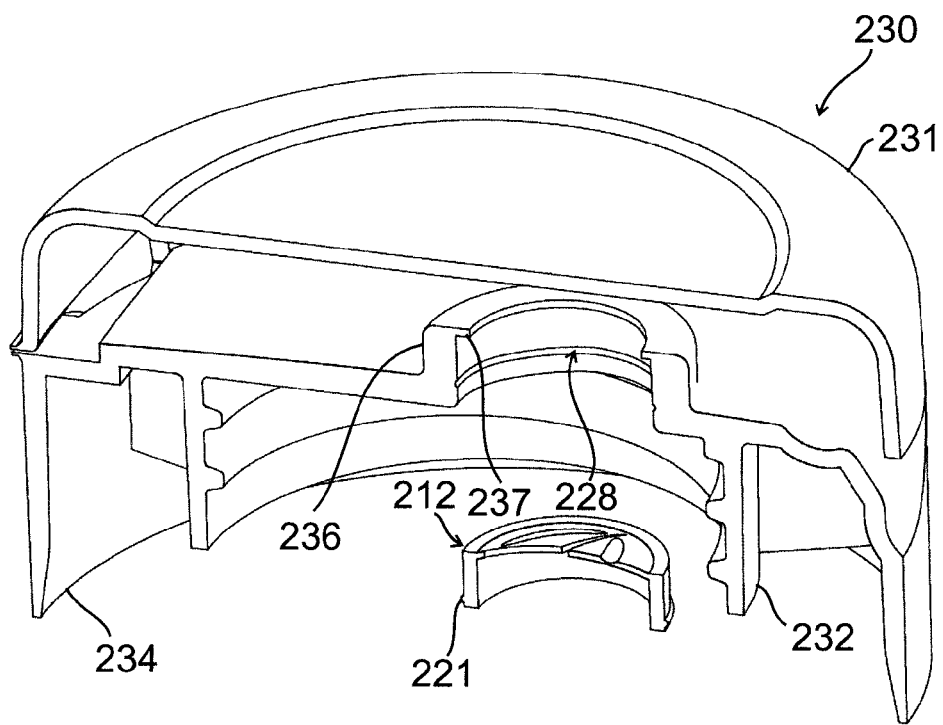
FIG. 28A shows the embodiment of FIG. 21 integrated into a cap before assembly.
Figure 28B:
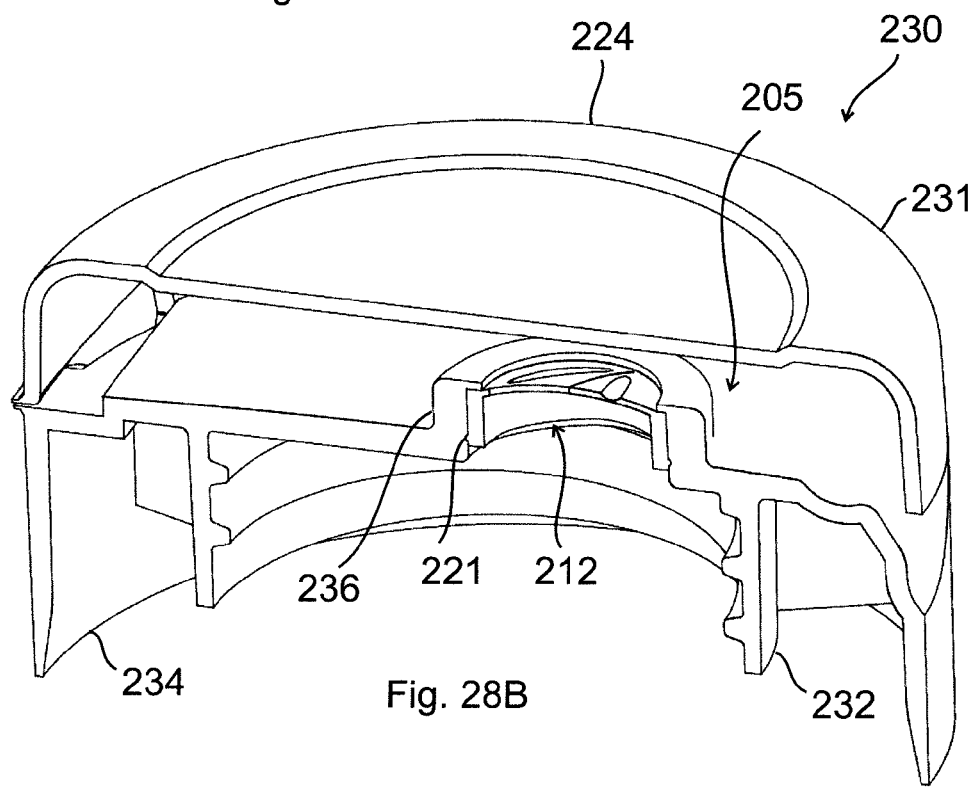
FIG. 28B shows the embodiment of FIG. 21 integrated into a cap.
Figure 33:
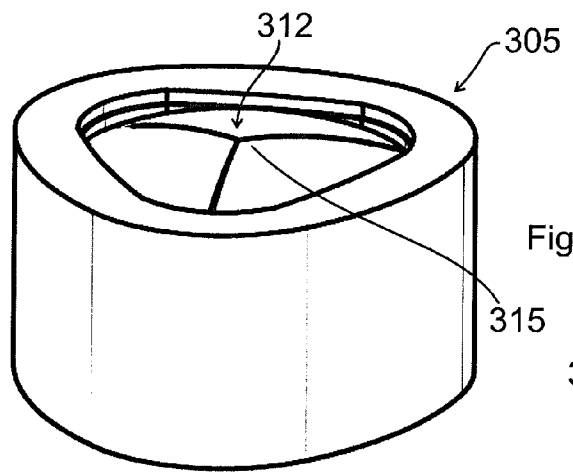
FIG. 33 shows the embodiment of FIG. 30 as assembled in a spatial top view.

An embodiment of the invention relates to a closure cap 230, in particular for closing a container containing a liquid. The closure cap 230 comprises a valvular closure element 205 fixed into the closure cap 230. FIGS. 28A and 28B shows the closure cap 230, which has a similar structure as the closure cap of FIGS. 7A and 7B, i.e. it comprises a cover 231, a neck 232 and a skirt 234. The receiving element 236 of the valvular closure element 205 is fixed into the closure cap 330, i.e. it is integrated into it. During the assembly of the valvular closure element 205, the valve insert 212 is inserted into the integrated receiving element 236, as it is illustrated in FIGS. 28A and 28B.

In FIGS. 29A to 29D, the valve insert 312 of the valvular closure element 305 (see FIGS. 33 to 36) is shown in different views. In FIG. 29A a spatial top view of the valve insert 312 is shown. The valve insert 312 comprises side wall 319 and cover portion 317; the cover portion 317 is formed with radially extending slits 314 defining valve flaps 315. In the present embodiment, a foot-like flange 321 is formed on the external periphery of the valve insert. In FIG. 29B section lines A-A and B-B are shown; FIGS. 29C and 29D show the respective sectional views of valve insert 312.

It is clear from FIGS. 29A to 29D that the periphery of the cover portion 317 is triangular-like with fine vertices and arched sides. These sides are pushed inwardly when the valve insert 312 is inserted into the receiving element 336, as a consequence of the configuration of the inner periphery of the receiving element 336 as detailed below.

In FIGS. 30 to 32 the assembly of the valvular closure element 305 is illustrated. In these figures the internal structure of the receiving element 336 can also be seen. Near—or at—the middle of the adjoining periphery corresponding to a valve flap 315 the internal periphery of the receiving element 336 is substantially planar—radius of curvature is very large—, and the internal periphery is arched near the vertices of the valve insert 312. As a consequence, for each valve flap 315, the internal periphery of the receiving element 336 is formed with larger radius of curvature at the middle of the adjoining periphery (central periphery points in the following) than at the slits 314 (side periphery points). It is shown in FIGS. 31A and 32 that a groove 328 is formed on the internal periphery of the receiving element 336 for receiving the flange 321. It is shown in FIGS. 30 and 31A that a rim 337 of annular shape is formed on the receiving element 336. The rim 337 has an inner radius being smaller than the inner radius of the receiving element 336.

The distance between the central—symmetry—axis of the valvular closure element 305 and the side periphery points is equal to the distance between the external side of a vertex and the central axis of the valve insert 312. The radius of the valve insert is the largest at the vertices. The distance between the central axis of the valvular closure element 305 and the central periphery points is smaller than the radius of the valve insert 312 at the halfway between two vertices in the external periphery. Therefore, the arched sides of the valve insert 312 are pushed inwardly by the planar parts of the internal periphery of the receiving element 336.

Figure 34:
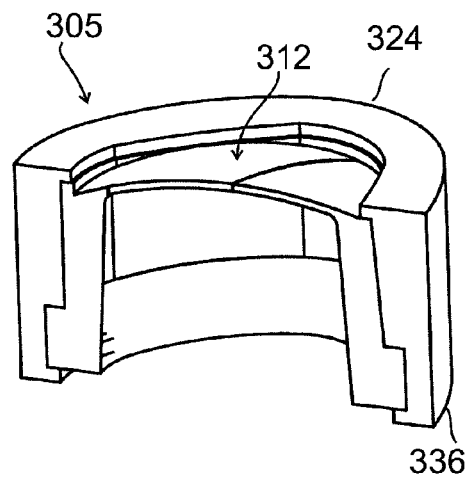
FIG. 34 shows the embodiment of FIG. 30 as assembled in a sectional view.
Figure 35:
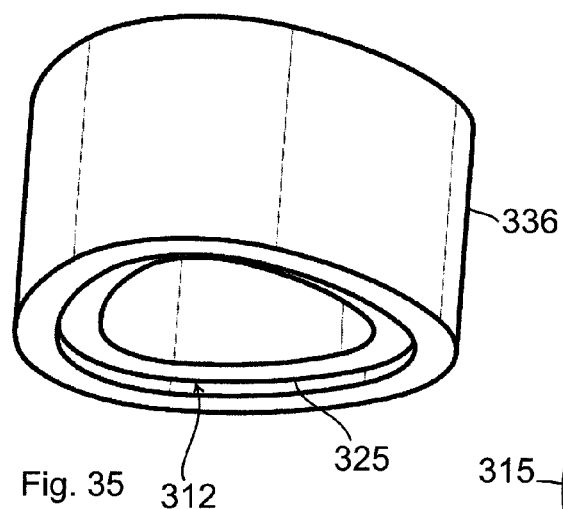
FIG. 35 shows the embodiment of FIG. 30 as assembled in a bottom view.

In FIGS. 33 to 36 the valvular closure element 305 is shown as assembled. As a consequence of the above detailed structure of the inner periphery of the receiving element 336, the slits 314 are closed when the valve insert 312 is inserted into the receiving element 336. It is shown in FIG. 34 that the groove 328 receives the flange 321, therefore, the valve insert 312 is fixed within the receiving element 336.

Figure 36:
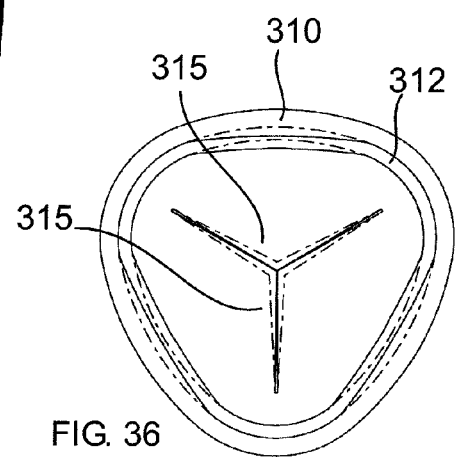
FIG. 36 shows the embodiment of FIG. 30 as assembled in a sectional view.

In FIG. 36 a sectional view of the assembled valvular closure element 305 is illustrated. In FIG. 36 the valvular closure element 305 is cut at half of its height, and it can be seen from the bottom, i.e. the walls of the valve insert 312 and the receiving element 336 can be seen, as well as the cover portion 317 from below. The single lines show the inserted state, i.e. the state when the valve insert 312 is inserted into the receiving element 336. The dashed lines show the rest state of the valve insert 312, i.e. its original state when it is not inserted into the receiving element 336. The contour of the internal periphery of the receiving element 336 determines the shape of the valve insert 312, i.e. deforms it. In FIG. 36 it is shown, that the slits 314 are opened at the rest state of the valve insert 312, and these slits 314 are closed when the valve insert 312 is inserted into the receiving element 336, as a consequence of the deformation of the valve insert 312. It is shown in the figure that the valve flap 315 is pushed inwardly near—or at—the middle of the adjoining periphery corresponding to the valve flap 315, and the valve insert 312 fits to the inner periphery of the receiving element 336 far from the middle of the adjoining periphery corresponding to the valve flap 315. This kind of deformation leads to appropriate closing of the valve flaps 315.

Figure 37A:
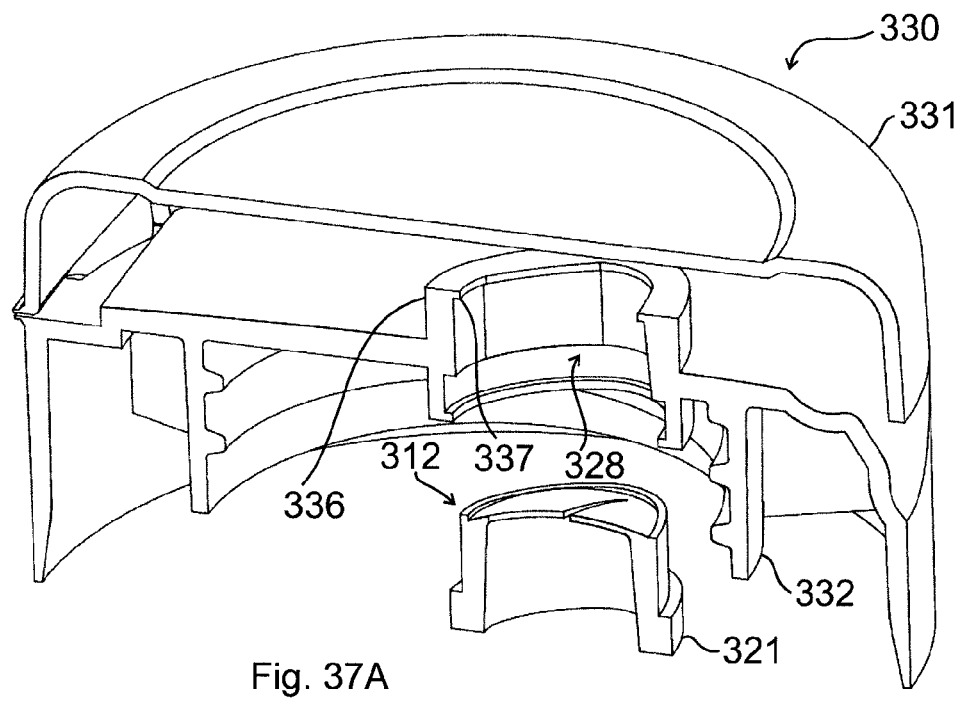
FIG. 37A shows the embodiment of FIG. 30 integrated in a cap before assembly.
Figure 37B:
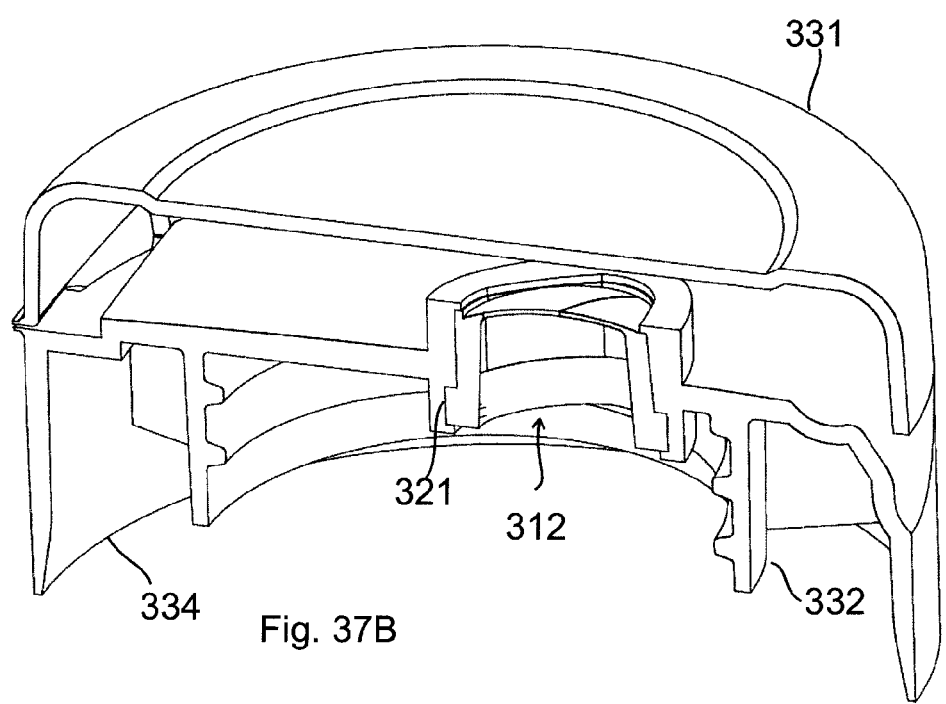
FIG. 37B shows the embodiment of FIG. 30 integrated in a cap.

An embodiment of the invention relates to a closure cap 330, in particular for closing a container containing a liquid, which comprises a valvular closure element 305 fixed into the closure cap 330. FIGS. 37A and 37B shows the closure cap 330, which has a similar structure as the closure cap of FIGS. 28A and 28B, i.e. it comprises a cover 331, a neck 332 and a skirt 334. The receiving element 336 of the valvular closure element 305 is fixed into the closure cap 330, i.e. it is integrated into it. During the assembly of the valvular closure element 305, the valve insert 312 is inserted into the integrated receiving element 336, as it is illustrated in FIGS. 37A and 37B.

The valvular closure element according to the invention may comprise a valve insert having more than three valve flaps; it is conceivable to have a valve insert with four or more valve flap. In the case of such valve inserts the number of projections on the support element or the structure of the receiving element fits to the symmetry of the valve flap.

The invention is, of course, not limited to the preferred embodiments described in details above, but further variants, modifications and developments are possible within the scope of protection defined by the following claims.

The invention claimed is:

1. A valvular closure element, for dispensing a liquid from a container, said valvular closure element comprising:
   a support element having an annular shape, and
   a valve insert having a side wall and a cover portion, being made of a resilient material, and abutting to an internal surface of the support element by its side wall, said cover portion is formed with slits defining valve flaps, wherein each valve flap has an adjoining periphery connected to the side wall,
   wherein
   the side wall has a cylindrical shape, and the slits are formed radially, and
   a projection is formed on the external periphery of the support element for each valve flap at the middle of the adjoining periphery of the respective valve flap.

2. The valvular closure element according to claim 1, wherein a flange is formed on the external periphery of the side wall, said flange is adapted for being received by a respective groove of a receiving element of a closure cap.

3. The valvular closure element according to claim 1, wherein the projection comprises two separated projection pieces and is formed on the external periphery of the support element.

4. The valvular closure element according to claim 3, wherein the projection pieces are separated with a recess having a larger height than the radial height of the projection pieces.

5. The valvular closure element according to claim 1, wherein weakening recesses are formed in the support element at a joining part of two neighbouring valve flaps.

6. The valvular closure element according to claim 1, wherein the side wall of the valve insert is thickened at a connection line of the side wall and the cover portion at the middle of the adjoining periphery of each valve flap.

7. The valvular closure element according to claim 1, wherein weakening grooves are formed on each valve flap substantially perpendicularly to a halving line of the respective valve flap.

8. A closure cap, in particular for closing a container containing a liquid, comprising:
   a receiving element, and a valvular closure element according to claim 1 inserted into the receiving element.

9. The closure cap according to claim 8, wherein
   a groove adapted for receiving the flange is formed in the receiving element,
   the valvular closure element is inserted into the receiving element, and
   the flange of the valvular closure element is received by the groove.

10. A method for manufacturing a valvular closure element comprising a support element having an annular shape, and a valve insert being made of a resilient material, having a side wall and a cover portion, and abutting to an internal surface of the support element by its side wall, wherein said cover portion is formed with slits defining valve flaps, wherein each valve flap has an adjoining periphery connected to the side wall, comprising the steps of:
    producing the support element in a first mould cavity by injection moulding, in the first mould cavity a projection is formed on the external periphery of the support element for each valve flap at the middle of the adjoining periphery of the respective valve flap and
    producing a valve insert in a second mould cavity by injection moulding, wherein a cylindrical shape is formed for the side wall in the second mould cavity, and the slits are formed radially.

11. The method according to claim 10, wherein producing the support element and the valve insert in the same apparatus, and the support element remains in its production position during the production of the valve insert.

12. The method according to claim 11, wherein producing the valve insert before total solidification of the support element.

13. The method according to claim 10, wherein, before producing the support element, confining the first mould cavity by
 a first casting mould and a second casting mould pressed to each other,
 a first movable tube adapted for pushing out the support element from the apparatus, wherein the first casting mould, the second casting mould and the first movable tube are adapted for shaping the external periphery and end-rings of the support element, and
 a second movable tube pushed to the second casting mould for shaping the internal periphery of the support element.

14. The method according to claim 13, wherein, before producing valve insert, confining the second mould cavity by
 the support element for shaping the external periphery of the side wall,
 the second movable tube retracted for shaping the cover portion,
 a side wall of a projection of the second casting mould for shaping the internal periphery of the side wall, and
 the top of the projection and an indentation of the first casting mould adapted for forming with slits defining valve flaps.

15. The method according to claim 13, wherein after producing the valve insert and removing the second casting mould, the valvular closure element is ejected from first mould and the second mould cavity by means of the first movable tube.

16. The method according to claim 10, wherein a flange is formed on the external periphery of the side wall in the first mould cavity, said flange is adapted for being received by a respective groove of a receiving element of a closure cap.

17. An apparatus for manufacturing a valvular closure element, said apparatus comprising:
 a first mould cavity for producing a support element by injection moulding, said support element having an annular shape, and
 a second mould cavity for producing a valve insert by injection moulding from a resilient material, said valve insert having a side wall and a cover portion, and abutting to an internal surface of the support element by its the side wall, wherein said cover portion is formed with slits defining valve flaps, wherein each valve flap has an adjoining periphery connected to the side wall,
wherein
 the first mould cavity is adapted for forming projections on the external periphery of the support element at the middle of the adjoining periphery of the valve flaps, and
 the second mould cavity is adapted for giving a cylindrical shape for the side wall, and for forming the slits substantially in radial direction.

18. The apparatus according to claim 17, comprising a first casting mould and a second casting mould, a first movable tube adapted for ejecting the support element from the apparatus, and a second movable tube for shaping the internal periphery of the support element, and the first mould cavity is confined by
 the first casting mould and the second casting mould pressed to each other,
 the first movable tube, wherein the first casting mould, the second casting mould and the first movable tube are adapted for shaping the external periphery and end-rings of the support element, and
 the second movable tube pushed to the second casting mould for shaping the internal periphery of the support element.

19. The apparatus according to claim 18, wherein the second mould cavity is confined by
 the support element for shaping the external periphery of the side wall,
 the second movable tube retracted for shaping the cover portion,
 a side wall of a projection of the second casting mould for shaping the internal periphery of the side wall, and
 the top of the projection and an indentation of the first casting mould adapted for forming with slits defining valve flaps.

\* \* \* \* \*